United States Patent
Chang et al.

(10) Patent No.: US 8,958,163 B2
(45) Date of Patent: Feb. 17, 2015

(54) MOBILE DEVICE AND OPTICAL IMAGING LENS

(71) Applicant: Genius Electronic Optical Co., Ltd., Taichung (TW)

(72) Inventors: Kuo-Wen Chang, Taichung (TW); Poche Lee, Taichung (TW); Wei-Yu Lo, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 30 days.

(21) Appl. No.: 13/757,651

(22) Filed: Feb. 1, 2013

(65) Prior Publication Data
US 2014/0118613 A1    May 1, 2014

(30) Foreign Application Priority Data
Oct. 31, 2012    (TW) .............................. 101140376 A

(51) Int. Cl.
*G02B 9/60* (2006.01)
*H04N 5/225* (2006.01)
*G02B 13/00* (2006.01)

(52) U.S. Cl.
CPC ................ *G02B 9/60* (2013.01); *H04N 5/2254* (2013.01); *G02B 13/0045* (2013.01)
USPC .......................................... 359/764; 359/714

(58) Field of Classification Search
CPC ......... G02B 9/00; G02B 9/60; G02B 13/0045
USPC .................................. 359/714, 746, 763–767
See application file for complete search history.

(56) References Cited

U.S. PATENT DOCUMENTS

| 2,445,594 A | 7/1948 | Bennett |
| 3,936,153 A | 2/1976 | Ogura |
| 4,674,844 A | 6/1987 | Nishioka et al. |

(Continued)

FOREIGN PATENT DOCUMENTS

| CN | 201508432 U | 6/2010 |
| CN | 201594156 U | 9/2010 |

(Continued)

OTHER PUBLICATIONS

Office Action (and brief English-Language Summary of the Grounds for Rejection) mailed Mar. 17, 2014 in Taiwan Application No. 101140376, 10 pages.

*Primary Examiner* — Darryl J Collins
(74) *Attorney, Agent, or Firm* — Kilpatrick Townsend & Stockton LLP

(57) ABSTRACT

An optical imaging lens includes first, second, third, fourth and fifth lens elements positioned sequentially from an object side to an image side. The first lens element with positive refractive power has an object-side surface comprising a convex portion in the optical axis vicinity. The second lens element with negative refractive power has an object-side surface comprising a convex portion in the optical axis vicinity and an image-side surface comprising a concave portion in the optical axis vicinity. The third lens element has an image-side surface comprising a convex portion in the periphery. The fourth lens element has an image-side surface comprising a convex portion in the optical axis vicinity. The fifth lens element has an object-side surface comprising a convex portion in the optical axis vicinity and an image-side surface comprising a concave portion in the optical axis vicinity and a convex portion in the periphery.

13 Claims, 21 Drawing Sheets

(56) References Cited

U.S. PATENT DOCUMENTS

| | | | |
|---|---|---|---|
| 6,108,146 A * | 8/2000 | Kenin et al. | 359/822 |
| 6,650,486 B2 | 11/2003 | Chen | |
| 6,940,661 B2 | 9/2005 | Chen | |
| 7,480,105 B2 | 1/2009 | Mori | |
| 7,826,151 B2 | 11/2010 | Tsai | |
| 7,864,454 B1 | 1/2011 | Tang | |
| 7,911,711 B1 | 3/2011 | Tang | |
| 8,000,031 B1 | 8/2011 | Tsai | |
| 8,072,695 B1 | 12/2011 | Lee et al. | |
| 8,179,613 B2 | 5/2012 | Sano | |
| 8,179,614 B1 | 5/2012 | Tsai | |
| 8,189,273 B2 | 5/2012 | Noda | |
| 8,233,224 B2 | 7/2012 | Chen | |
| 8,310,768 B2 | 11/2012 | Lin | |
| 8,325,429 B2 | 12/2012 | Tang | |
| 8,395,691 B2 | 3/2013 | Tang | |
| 8,400,716 B2 | 3/2013 | Jeong | |
| 2004/0240080 A1 | 12/2004 | Matsui et al. | |
| 2007/0229984 A1 | 10/2007 | Shinohara | |
| 2007/0236811 A1 | 10/2007 | Mori | |
| 2010/0033616 A1 | 2/2010 | Huang et al. | |
| 2010/0253829 A1 | 10/2010 | Shinohara | |
| 2010/0254029 A1 | 10/2010 | Shinohara | |
| 2011/0013069 A1 | 1/2011 | Chen | |
| 2011/0176049 A1 | 7/2011 | Hsieh | |
| 2011/0249346 A1 | 10/2011 | Tang | |
| 2011/0310287 A1 * | 12/2011 | Ohtsu | 348/340 |
| 2011/0316969 A1 | 12/2011 | Hsieh | |
| 2012/0069455 A1 | 3/2012 | Lin | |
| 2012/0087019 A1 | 4/2012 | Tang | |
| 2012/0087020 A1 | 4/2012 | Tang | |
| 2012/0092544 A1 | 4/2012 | Noda | |
| 2012/0140104 A1 | 6/2012 | Ozaki | |
| 2012/0147482 A1 | 6/2012 | Tsai | |
| 2012/0262806 A1 | 10/2012 | Huang | |
| 2013/0038947 A1 | 2/2013 | Tsai | |
| 2013/0100542 A1 | 4/2013 | Tsai | |
| 2013/0170048 A1 * | 7/2013 | Lai | 359/714 |
| 2013/0258164 A1 * | 10/2013 | Chang et al. | 348/345 |
| 2013/0329307 A1 | 12/2013 | Jung | |

FOREIGN PATENT DOCUMENTS

| | | |
|---|---|---|
| CN | 101995641 A | 3/2011 |
| JP | 2009-294527 A | 12/2009 |
| JP | 2011085733 A | 4/2011 |
| JP | 2011257447 A | 12/2011 |
| JP | 2012087019 A | 5/2012 |
| JP | 2012208148 A | 10/2012 |
| JP | 2012208326 A | 10/2012 |
| JP | 2013011710 A | 1/2013 |
| JP | 2013257527 A | 12/2013 |
| TW | M369459 U | 11/2009 |
| TW | 201213926 A | 4/2012 |
| TW | 201227044 A | 7/2012 |
| WO | 2010024198 A1 | 3/2010 |

* cited by examiner

| f(Focus)=3.30 mm,HFOV(Half angular field of view)= 34.79 deg. ||||||||
|---|---|---|---|---|---|---|---|
| Surface # | | Radius | Thickness | Refractive index | Abbe number | Material | Focus |
| - | Object | ∞ | 600.00000 | | | | |
| 100 | Aperture stop | ∞ | -0.20377 | | | | |
| 111 | 1st lens element | 1.165 | 0.490 | 1.546 | 56.114 | plastic | 2.145 |
| 112 | | 184.352 | 0.051 | | | | |
| 121 | 2nd lens element | 7.975 | 0.244 | 1.637 | 23.340 | plastic | -3.593 |
| 122 | | 1.757 | 0.345 | | | | |
| 131 | 3rd lens element | 6.532 | 0.243 | 1.637 | 23.340 | plastic | 126.442 |
| 132 | | 7.005 | 0.187 | | | | |
| 141 | 4th lens element | -2.096 | 0.549 | 1.536 | 55.699 | plastic | 5.404 |
| 142 | | -1.328 | 0.278 | | | | |
| 151 | 5th lens element | 1.482 | 0.392 | 1.536 | 55.699 | plastic | -4.981 |
| 152 | | 0.865 | 0.444 | | | | |
| 161 | IR cut filter | ∞ | 0.300 | | | | |
| 162 | | ∞ | 0.358 | | | | |
| 170 | Image plane | ∞ | -0.003 | | | | |

FIG.4

| Aspherical parameters | | | | | |
|---|---|---|---|---|---|
| Surface # | 111 | 112 | 121 | 122 | 131 |
| K | -1.0105E-02 | 0.0000E+00 | 0.0000E+00 | 9.2072E-01 | 0.0000E+00 |
| $a_4$ | 9.9298E-03 | -1.8345E-01 | -3.1092E-01 | -1.7860E-01 | -3.4924E-01 |
| $a_6$ | -1.2488E-01 | 1.0221E+00 | 1.6856E+00 | 9.4110E-01 | 2.0160E-01 |
| $a_8$ | 1.3490E+00 | -2.6271E+00 | -4.7314E+00 | -1.4747E+00 | -4.2327E-01 |
| $a_{10}$ | -7.5727E+00 | 3.4969E+00 | 8.4093E+00 | -5.9636E-01 | 2.6745E-01 |
| $a_{12}$ | 2.5356E+01 | -2.6444E+00 | -9.5076E+00 | 1.1474E+01 | 2.2161E-01 |
| $a_{14}$ | -5.1450E+01 | - | 4.3863E+00 | -2.5696E+01 | 7.2824E-01 |
| $a_{16}$ | 5.8439E+01 | - | - | 2.4089E+01 | -9.8944E-01 |
| $a_{18}$ | -2.9258E+01 | - | - | -6.0796E+00 | - |
| Surface # | 132 | 141 | 142 | 151 | 152 |
| K | 0.0000E+00 | 8.8531E-01 | -1.0000E+00 | -1.0000E+00 | -1.0000E+00 |
| $a_4$ | -2.8033E-01 | -1.5592E-02 | -3.1310E-01 | -1.0275E+00 | -1.0485E+00 |
| $a_6$ | 1.3849E-01 | -3.8745E-01 | 8.3333E-01 | 1.3398E+00 | 1.5361E+00 |
| $a_8$ | -1.1472E-01 | 1.9930E+00 | -1.4580E+00 | -1.1910E+00 | -1.9060E+00 |
| $a_{10}$ | 8.0974E-02 | -4.9371E+00 | 2.0427E+00 | 7.1942E-01 | 1.8375E+00 |
| $a_{12}$ | 1.2532E-01 | 1.0765E+01 | -1.6327E+00 | -2.8646E-01 | -1.3318E+00 |
| $a_{14}$ | 1.1050E-01 | -1.8279E+01 | 6.6409E-01 | 7.4333E-02 | 7.0647E-01 |
| $a_{16}$ | -1.7760E-01 | 2.0107E+01 | -1.2282E-01 | -1.2407E-02 | -2.6725E-01 |
| $a_{18}$ | - | -1.2493E+01 | 7.1459E-03 | 1.2633E-03 | 6.9676E-02 |
| $a_{20}$ | - | 3.3128E+00 | - | -6.2339E-05 | -1.1832E-02 |
| $a_{22}$ | - | - | - | - | 1.1730E-03 |
| $a_{24}$ | - | - | - | - | -5.1320E-05 |

FIG.5

| f(Focus)=3.34 mm,HFOV(Half angular field of view)= 34.50 deg. |||||||
|---|---|---|---|---|---|---|
| Surface # | | Radius | Thickness | Refractive index | Abbe number | Material | Focus |
| - | Object | ∞ | 600.00000 | | | | |
| 200 | Aperture stop | ∞ | -0.21036 | | | | |
| 211 | 1st lens element | 1.161 | 0.544 | 1.546 | 56.114 | plastic | 2.113 |
| 212 | | -146.187 | 0.036 | | | | |
| 221 | 2nd lens element | 8.790 | 0.220 | 1.637 | 23.340 | plastic | -3.490 |
| 222 | | 1.757 | 0.365 | | | | |
| 231 | 3rd lens element | 7.517 | 0.234 | 1.637 | 23.340 | plastic | 66.216 |
| 232 | | 9.036 | 0.229 | | | | |
| 241 | 4th lens element | -2.002 | 0.551 | 1.536 | 55.699 | plastic | 5.023 |
| 242 | | -1.259 | 0.198 | | | | |
| 251 | 5th lens element | 1.429 | 0.353 | 1.536 | 55.699 | plastic | -4.664 |
| 252 | | 0.831 | 0.444 | | | | |
| 261 | IR cut filter | ∞ | 0.300 | | | | |
| 262 | | ∞ | 0.425 | | | | |
| 270 | Image plane | ∞ | 0.002 | | | | |

FIG.8

| Aspherical parameters | | | | | |
|---|---|---|---|---|---|
| Surface # | 211 | 212 | 221 | 222 | 231 |
| K | -5.1580E-03 | 0.0000E+00 | 0.0000E+00 | 8.8128E-01 | 0.0000E+00 |
| $a_4$ | 1.1742E-02 | -1.8345E-01 | -3.1859E-01 | -1.7886E-01 | -3.3459E-01 |
| $a_6$ | -1.2805E-01 | 1.0221E+00 | 1.6939E+00 | 9.2786E-01 | 1.7282E-01 |
| $a_8$ | 1.3392E+00 | -2.6271E+00 | -4.6949E+00 | -1.4440E+00 | -4.4113E-01 |
| $a_{10}$ | -7.5851E+00 | 3.4969E+00 | 8.4660E+00 | -5.1111E-01 | 2.7318E-01 |
| $a_{12}$ | 2.5359E+01 | -2.6444E+00 | -9.5189E+00 | 1.1474E+01 | 2.4167E-01 |
| $a_{14}$ | -5.1393E-01 | - | 4.1501E+00 | -2.5696E-01 | 7.7784E-01 |
| $a_{16}$ | 5.8544E+01 | - | - | 2.4089E+01 | -9.8944E-01 |
| $a_{18}$ | -2.9258E+01 | - | - | -6.0796E+00 | - |
| Surface # | 232 | 241 | 242 | 251 | 252 |
| K | 0.0000E+00 | 9.9089E-01 | -1.0000E+00 | -1.0000E+00 | -1.0000E+00 |
| $a_4$ | -2.7540E-01 | -1.3624E-02 | -3.1196E-01 | -1.1398E+00 | -1.1584E+00 |
| $a_6$ | 1.3779E-01 | -4.1330E-01 | 8.2878E-01 | 1.5654E+00 | 1.7839E+00 |
| $a_8$ | -1.3227E-01 | 2.0072E+00 | -1.4474E+00 | -1.4658E+00 | -2.3267E+00 |
| $a_{10}$ | 8.0045E-02 | -4.9293E+00 | 2.0242E+00 | 9.3253E-01 | 2.3578E+00 |
| $a_{12}$ | 1.3540E-01 | 1.0762E+01 | -1.6149E+00 | -3.9109E-01 | -1.7963E+00 |
| $a_{14}$ | 1.1643E-01 | -1.8291E+01 | 6.5567E-01 | 1.0689E-01 | 1.0016E+00 |
| $a_{16}$ | -1.8729E-01 | 2.0098E+01 | -1.2104E-01 | -1.8791E-02 | -3.9824E-01 |
| $a_{18}$ | - | -1.2494E+01 | 7.0296E-03 | 2.0152E-03 | 1.0914E-01 |
| $a_{20}$ | - | 3.3180E+00 | - | -1.0474E-04 | -1.9481E-02 |
| $a_{22}$ | - | - | - | - | 2.0300E-03 |
| $a_{24}$ | - | - | - | - | -9.3354E-05 |

FIG.9

| f(Focus)=3.36 mm,HFOV(Half angular field of view)= 34.4 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 300 | Aperture stop | ∞ | -0.21019 | | | | |
| 311 | 1st lens element | 1.180 | 0.619 | 1.546 | 56.114 | plastic | 2.103 |
| 312 | | -35.024 | 0.046 | | | | |
| 321 | 2nd lens element | 18.676 | 0.209 | 1.637 | 23.340 | plastic | -3.329 |
| 322 | | 1.896 | 0.364 | | | | |
| 331 | 3rd lens element | 9.257 | 0.228 | 1.637 | 23.340 | plastic | 29.106 |
| 332 | | 18.306 | 0.220 | | | | |
| 341 | 4th lens element | -1.862 | 0.509 | 1.536 | 55.699 | plastic | 5.648 |
| 342 | | -1.263 | 0.241 | | | | |
| 351 | 5th lens element | 1.447 | 0.354 | 1.536 | 55.699 | plastic | -4.692 |
| 352 | | 0.840 | 0.444 | | | | |
| 361 | IR cut filter | ∞ | 0.300 | | | | |
| 362 | | ∞ | 0.371 | | | | |
| 370 | Image plane | ∞ | -0.007 | | | | |

FIG.12

| Aspherical parameters | | | | | |
|---|---|---|---|---|---|
| Surface # | 311 | 312 | 321 | 322 | 331 |
| K | -6.1281E-03 | 0.0000E+00 | 0.0000E+00 | 9.5361E-01 | 0.0000E+00 |
| $a_4$ | 9.4262E-03 | -1.8345E-01 | -3.1726E-01 | -1.7711E-01 | -3.4663E-01 |
| $a_6$ | -1.2390E-01 | 1.0221E+00 | 1.6924E+00 | 9.4397E-01 | 1.7619E-01 |
| $a_8$ | 1.3432E+00 | -2.6271E+00 | -4.7169E+00 | -1.4792E+00 | -4.6514E-01 |
| $a_{10}$ | -7.5839E+00 | 3.4969E+00 | 8.4064E+00 | -6.3879E-01 | 2.1399E-01 |
| $a_{12}$ | 2.5341E+01 | -2.6444E+00 | -9.4543E+00 | 1.1432E+01 | 1.9963E-01 |
| $a_{14}$ | -5.1362E+01 | - | 3.9814E+00 | -2.5696E+01 | 8.3182E-01 |
| $a_{16}$ | 5.8708E+01 | - | - | 2.4089E+01 | -9.8944E-01 |
| $a_{18}$ | -2.9258E+01 | - | - | -6.0796E+00 | - |
| Surface # | 332 | 341 | 342 | 351 | 352 |
| K | 0.0000E+00 | 9.4323E-01 | -1.0000E+00 | -1.0000E+00 | -1.0000E+00 |
| $a_4$ | -2.8629E-01 | -2.7954E-02 | -3.1736E-01 | -1.1001E+00 | -1.1246E+00 |
| $a_6$ | 1.1559E-01 | -3.8300E-01 | 8.5040E-01 | 1.4843E+00 | 1.7063E+00 |
| $a_8$ | -1.3786E-01 | 2.0025E+00 | -1.4979E+00 | -1.3654E+00 | -2.1927E+00 |
| $a_{10}$ | 7.2328E-02 | -4.9347E+00 | 2.1130E+00 | 8.5339E-01 | 2.1893E+00 |
| $a_{12}$ | 1.2606E-01 | 1.0764E+01 | -1.7003E+00 | -3.5161E-01 | -1.6433E+00 |
| $a_{14}$ | 1.1705E-01 | -1.8282E+01 | 6.9628E-01 | 9.4409E-02 | 9.0279E-01 |
| $a_{16}$ | -1.7118E-01 | 2.0105E+01 | -1.2964E-01 | -1.6305E-02 | -3.5368E-01 |
| $a_{18}$ | - | -1.2498E+01 | 7.5942E-03 | 1.7179E-03 | 9.5499E-02 |
| $a_{20}$ | - | 3.3038E+00 | - | -8.7718E-05 | -1.6796E-02 |
| $a_{22}$ | - | - | - | - | 1.7244E-03 |
| $a_{24}$ | - | - | - | - | -7.8134E-05 |

FIG.13

| f(Focus)=3.28 mm,HFOV(Half angular field of view)= 34.99 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 400 | Aperture stop | ∞ | -0.20385 | | | | |
| 411 | 1st lens element | 1.151 | 0.501 | 1.546 | 56.114 | plastic | 2.110 |
| 412 | | 1477.559 | 0.065 | | | | |
| 421 | 2nd lens element | 12.516 | 0.241 | 1.637 | 23.340 | plastic | -3.424 |
| 422 | | 1.844 | 0.321 | | | | |
| 431 | 3rd lens element | 8.336 | 0.274 | 1.637 | 23.340 | plastic | 145.206 |
| 432 | | 9.044 | 0.236 | | | | |
| 441 | 4th lens element | -2.120 | 0.489 | 1.536 | 55.699 | plastic | 4.919 |
| 442 | | -1.919 | 0.290 | | | | |
| 451 | 5th lens element | -7.590 | 0.352 | 1.536 | 55.699 | plastic | -4.521 |
| 452 | | -7.129 | 0.444 | | | | |
| 461 | IR cut filter | ∞ | 0.300 | | | | |
| 462 | | ∞ | 0.318 | | | | |
| 470 | Image plane | ∞ | 0.002 | | | | |

FIG.16

| Aspherical parameters | | | | | |
|---|---|---|---|---|---|
| Surface # | 411 | 412 | 421 | 422 | 431 |
| K | -1.1473E-02 | 0.0000E+00 | 0.0000E+00 | 9.5292E-01 | 0.0000E+00 |
| $a_4$ | 1.0250E-02 | -1.7246E-01 | -3.0473E-01 | -1.7777E-01 | -3.6754E-01 |
| $a_6$ | -1.2738E-01 | 9.3223E-01 | 1.6870E+00 | 9.4131E-01 | 1.8266E-01 |
| $a_8$ | 1.3441E+00 | -2.3295E+00 | -4.7179E+00 | -1.4503E+00 | -4.1929E-01 |
| $a_{10}$ | -7.5738E+00 | 3.0433E+00 | 8.4468E+00 | -5.1649E-01 | 2.9956E-01 |
| $a_{12}$ | 2.5353E+01 | -2.3807E+00 | -9.4695E+00 | 1.1551E+01 | 2.8008E-01 |
| $a_{14}$ | -5.1416E+01 | - | 4.2265E+00 | -2.5696E+01 | 7.9947E-01 |
| $a_{16}$ | 5.8420E+01 | - | - | 2.4089E+01 | -9.8944E-01 |
| $a_{18}$ | -2.9258E+01 | - | - | -6.0796E+00 | - |
| Surface # | 432 | 441 | 442 | 451 | 452 |
| K | 0.0000E+00 | 9.5712E-01 | -1.0000E+00 | -1.0000E+00 | -1.0000E+00 |
| $a_4$ | -2.7982E-01 | -1.2214E-02 | -3.0446E-01 | -1.1776E+00 | -1.2420E+00 |
| $a_6$ | 1.3922E-01 | -3.9816E-01 | 8.5587E-01 | 1.6396E+00 | 1.9935E+00 |
| $a_8$ | -1.2108E-01 | 1.9865E+00 | -1.6231E+00 | -1.5589E+00 | -2.6824E+00 |
| $a_{10}$ | 7.3375E-02 | -4.9398E+00 | 2.4928E+00 | 1.0133E+00 | 2.7784E+00 |
| $a_{12}$ | 1.1972E-01 | 1.0765E+01 | -2.1382E+00 | -4.3922E-01 | -2.1454E+00 |
| $a_{14}$ | 1.1097E-01 | -1.8278E+01 | 9.2213E-01 | 1.2622E-01 | 1.2052E+00 |
| $a_{16}$ | -1.6708E-01 | 2.0106E+01 | -1.7947E-01 | -2.3800E-02 | -4.8107E-01 |
| $a_{18}$ | - | -1.2497E+01 | 1.0844E-02 | 2.7717E-03 | 1.3211E-01 |
| $a_{20}$ | - | 3.3058E+00 | - | -1.5515E-04 | -2.3623E-02 |
| $a_{22}$ | - | - | - | - | 2.4669E-03 |
| $a_{24}$ | - | - | - | - | -1.1380E-04 |

FIG.17

| f(Focus)=4.19 mm,HFOV(Half angular field of view)= 33.4 deg. |||||||| 
|---|---|---|---|---|---|---|---|
| Surface # | | Radius | Thickness | Refractive index | Abbe number | Material | Focus |
| - | Object | ∞ | 600.00000 | | | | |
| 500 | Aperture stop | ∞ | -0.28823 | | | | |
| 511 | 1st lens element | 1.385 | 0.621 | 1.546 | 56.114 | plastic | 2.568 |
| 512 | | 94.502 | 0.100 | | | | |
| 521 | 2nd lens element | 15.150 | 0.251 | 1.637 | 23.340 | plastic | -3.991 |
| 522 | | 2.163 | 0.476 | | | | |
| 531 | 3rd lens element | 8.092 | 0.282 | 1.637 | 23.340 | plastic | 16.360 |
| 532 | | 35.689 | 0.444 | | | | |
| 541 | 4th lens element | -1.941 | 0.624 | 1.536 | 55.699 | plastic | 7.314 |
| 542 | | -1.444 | 0.130 | | | | |
| 551 | 5th lens element | 2.412 | 0.511 | 1.536 | 55.699 | plastic | -5.223 |
| 552 | | 1.200 | 0.547 | | | | |
| 561 | IR cut filter | ∞ | 0.300 | | | | |
| 562 | | ∞ | 0.477 | | | | |
| 570 | Image plane | ∞ | 0.011 | | | | |

FIG.20

| Aspherical parameters | | | | | |
|---|---|---|---|---|---|
| Surface # | 511 | 512 | 521 | 522 | 531 |
| K | 1.5346E-02 | 0.0000E+00 | 0.0000E+00 | 2.9572E-01 | 0.0000E+00 |
| $a_4$ | 7.6860E-03 | -6.8747E-02 | -1.7380E-01 | -1.1378E-01 | -1.5246E-01 |
| $a_6$ | -5.2959E-02 | 2.5202E-01 | 5.8054E-01 | 3.8836E-01 | 6.3055E-02 |
| $a_8$ | 3.3273E-01 | -3.8357E-01 | -1.0798E+00 | -3.9314E-01 | -9.1941E-02 |
| $a_{10}$ | -1.1684E+00 | 2.7018E-01 | 1.2739E+00 | -8.8474E-02 | 6.6243E-02 |
| $a_{12}$ | 2.5697E+00 | -1.3997E-01 | -1.0122E+00 | 1.1770E+00 | 5.5932E-04 |
| $a_{14}$ | -3.4518E+00 | - | 3.5376E-01 | -1.7179E+00 | -1.5368E-02 |
| $a_{16}$ | 2.5736E+00 | - | - | 1.0375E+00 | -3.1268E-03 |
| $a_{18}$ | -8.3102E-01 | - | - | -7.8486E-02 | - |
| Surface # | 532 | 541 | 542 | 551 | 552 |
| K | 0.0000E+00 | 1.4412E-01 | -1.0000E+00 | 0.0000E+00 | -1.0000E+00 |
| $a_4$ | -1.0435E-01 | 1.8231E-02 | -2.3956E-01 | -6.3337E-01 | -5.3863E-01 |
| $a_6$ | 5.4439E-02 | -1.4024E-01 | 6.1465E-01 | 7.5647E-01 | 5.4917E-01 |
| $a_8$ | -2.8176E-02 | 4.6220E-01 | -1.1317E+00 | -7.5398E-01 | -4.8978E-01 |
| $a_{10}$ | 1.0020E-02 | -7.5766E-01 | 1.6894E+00 | 6.4454E-01 | 3.4279E-01 |
| $a_{12}$ | 2.6440E-03 | 1.0858E+00 | -1.8007E+00 | -4.6694E-01 | -1.8131E-01 |
| $a_{14}$ | 2.9136E-04 | -1.2154E+00 | 1.3372E+00 | 2.7409E-01 | 7.0361E-02 |
| $a_{16}$ | -9.4101E-04 | 8.8058E-01 | -6.6641E-01 | -1.2316E-01 | -1.9473E-02 |
| $a_{18}$ | - | -3.6108E-01 | 2.0908E-01 | 4.0696E-02 | 3.7079E-03 |
| $a_{20}$ | - | 6.2986E-02 | -3.6999E-02 | -9.6186E-03 | -4.5859E-04 |
| $a_{22}$ | - | - | 2.8066E-03 | 1.5766E-03 | 3.3011E-05 |
| $a_{24}$ | - | - | - | -1.7012E-04 | -1.0460E-06 |
| $a_{26}$ | - | - | - | 1.0870E-05 | - |
| $a_{28}$ | - | - | - | -3.1183E-07 | - |

FIG.21

| f(Focus)=3.30 mm,HFOV(Half angular field of view)= 34.93 deg. ||||||||
|---|---|---|---|---|---|---|---|
| Surface # | | Radius | Thickness | Refractive index | Abbe number | Material | Focus |
| - | Object | ∞ | 600.00000 | | | | |
| 600 | Aperture stop | ∞ | -0.20895 | | | | |
| 611 | 1st lens element | 1.151 | 0.461 | 1.546 | 56.114 | plastic | 2.186 |
| 612 | | 28.063 | 0.076 | | | | |
| 621 | 2nd lens element | 10.904 | 0.225 | 1.637 | 23.340 | plastic | -3.530 |
| 622 | | 1.850 | 0.340 | | | | |
| 631 | 3rd lens element | 4.512 | 0.220 | 1.637 | 23.340 | plastic | 29.964 |
| 632 | | 5.796 | 0.232 | | | | |
| 641 | 4th lens element | -2.066 | 0.536 | 1.536 | 55.699 | plastic | 5.280 |
| 642 | | -1.303 | 0.252 | | | | |
| 651 | 5th lens element | 1.449 | 0.379 | 1.536 | 55.699 | plastic | -4.865 |
| 652 | | 0.847 | 0.444 | | | | |
| 661 | IR cut filter | ∞ | 0.300 | | | | |
| 662 | | ∞ | 0.397 | | | | |
| 670 | Image plane | ∞ | -0.002 | | | | |

FIG.24

| Aspherical parameters | | | | | |
|---|---|---|---|---|---|
| Surface # | 611 | 612 | 621 | 622 | 631 |
| K | -3.0687E-03 | 0.0000E+00 | 0.0000E+00 | 1.1568E+00 | 0.0000E+00 |
| $a_4$ | 6.8301E-03 | -1.8345E-01 | -3.0499E-01 | -1.7221E-01 | -3.3934E-01 |
| $a_6$ | -1.1118E-01 | 1.0221E+00 | 1.6813E+00 | 9.8034E-01 | 2.2312E-01 |
| $a_8$ | 1.3764E+00 | -2.6271E+00 | -4.7865E+00 | -1.5297E+00 | -3.9359E-01 |
| $a_{10}$ | -7.5416E+00 | 3.4969E+00 | 8.3484E+00 | -6.9681E-01 | 2.9168E-01 |
| $a_{12}$ | 2.5229E+01 | -2.6444E+00 | -9.4717E+00 | 1.1593E+01 | 2.4170E-01 |
| $a_{14}$ | -5.1483E+01 | - | 4.5140E+00 | -2.5696E+01 | 6.0010E-01 |
| $a_{16}$ | 5.8623E+01 | - | - | 2.4089E+01 | -9.8944E-01 |
| $a_{18}$ | -2.9258E+01 | - | - | -6.0796E+00 | - |
| Surface # | 632 | 641 | 642 | 651 | 652 |
| K | 0.0000E+00 | 8.5683E-01 | -1.0000E+00 | -1.0000E+00 | -1.0000E+00 |
| $a_4$ | -2.7622E-01 | -1.0724E-02 | -3.1985E-01 | -1.0719E+00 | -1.0881E+00 |
| $a_6$ | 1.4533E-01 | -3.9482E-01 | 8.6041E-01 | 1.4276E+00 | 1.6239E+00 |
| $a_8$ | -1.1043E-01 | 1.9911E+00 | -1.5215E+00 | -1.2962E+00 | -2.0526E+00 |
| $a_{10}$ | 8.2223E-02 | -4.9394E+00 | 2.1546E+00 | 7.9971E-01 | 2.0159E+00 |
| $a_{12}$ | 1.1898E-01 | 1.0761E+01 | -1.7405E+00 | -3.2523E-01 | -1.4884E+00 |
| $a_{14}$ | 9.9297E-02 | -1.8282E+01 | 7.1556E-01 | 8.6200E-02 | 8.0431E-01 |
| $a_{16}$ | -1.7342E-01 | 2.0105E+01 | -1.3375E-01 | -1.4695E-02 | -3.0995E-01 |
| $a_{18}$ | - | -1.2493E+01 | 7.8656E-03 | 1.5283E-03 | 8.2320E-02 |
| $a_{20}$ | - | 3.3163E+00 | - | -7.7029E-05 | -1.4241E-02 |
| $a_{22}$ | - | - | - | - | 1.4382E-03 |
| $a_{24}$ | - | - | - | - | -6.4099E-05 |

FIG.25

| Embodiment | 1st Embodiment | 2nd Embodiment | 3rd Embodiment | 4th Embodiment | 5th Embodiment | 6th Embodiment |
|---|---|---|---|---|---|---|
| $T_1$ (mm) | 0.49 | 0.54 | 0.62 | 0.50 | 0.62 | 0.46 |
| $G_{12}$ (mm) | 0.05 | 0.04 | 0.05 | 0.07 | 0.10 | 0.08 |
| $G_{45}$ (mm) | 0.28 | 0.20 | 0.24 | 0.29 | 0.13 | 0.25 |
| ALT (mm) | 1.92 | 1.90 | 1.92 | 1.86 | 2.29 | 1.82 |
| f (mm) | 3.30 | 3.34 | 3.36 | 3.40 | 3.40 | 3.40 |
| $f_3$ (mm) | 126.44 | 66.22 | 29.11 | 21.19 | 21.19 | 21.19 |
| $ALT/T_1$ | 3.92 | 3.50 | 3.10 | 3.71 | 3.69 | 3.95 |
| $G_{aa}/G_{12}$ | 16.78 | 23.00 | 18.94 | 14.02 | 11.50 | 11.83 |
| $G_{45}/G_{12}$ | 5.42 | 5.50 | 5.24 | 4.45 | 1.30 | 3.31 |
| $f_3/f$ | 38.26 | 19.80 | 8.66 | 6.22 | 6.22 | 6.22 |
| $G_{aa}/T_1$ | 1.76 | 1.52 | 1.41 | 1.82 | 1.85 | 1.95 |
| $T_1/G_{12}$ | 9.53 | 15.10 | 13.46 | 7.70 | 6.21 | 6.05 |
| $G_{aa}$ (mm) | 0.86 | 0.83 | 0.87 | 0.91 | 1.15 | 0.90 |
| $G_{aa}/(ALT*G_{12})$ | 8.74 | 12.09 | 9.87 | 7.55 | 5.02 | 6.50 |
| $G_{aa}/(G_{12}+G_{45})$ | 2.61 | 3.54 | 3.04 | 2.57 | 5.00 | 2.74 |
| Fno (mm) | 2.45 | 2.45 | 2.45 | 2.45 | 2.40 | 2.45 |

FIG.26

MOBILE DEVICE AND OPTICAL IMAGING LENS

CROSS-REFERENCES TO RELATED APPLICATIONS

This application claims priority to Taiwan Patent Application No. 101140376, filed on Oct. 31, 2012, the content of which is hereby incorporated by reference in its entirety for all purposes.

BACKGROUND OF THE INVENTION

The present invention relates to a mobile device and an optical imaging lens thereof, and particularly, relates to a mobile device applying an optical imaging lens having five lens elements and an optical imaging lens thereof.

The ever-increasing demand for smaller sized mobile devices, such as cell phones, digital cameras, etc. has correspondingly triggered a growing need for smaller sized photography modules contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

US Patent Publication No. 2011176049, US Patent Publication No. 20110316969, and U.S. Pat. No. 7,480,105 all disclosed an optical imaging lens constructed with an optical imaging lens having five lens elements, in which the first lens element has negative refractive power, which is difficult to reduce the length of the optical imaging lens and maintain good optical characteristics.

US Patent Publication No. 20120069455, US Patent Publication No. 20100254029, TW Patent No. M369459, and JP Patent Publication No. 2010-224521 all disclosed an optical imaging lens constructed with an optical imaging lens having five lens elements, in which the portion of embodiments have excessive sum of all air gaps between the lens elements along the optical axis, which is unfavorable for endeavoring slimmer mobile devices, such as cell phones and digital cameras.

US Patent Publication No. 20120087019, US Patent Publication No. 20120087020, US Patent Publication No. 20120105704, and U.S. Pat. No. 8,179,614 all disclosed an optical image lens constructed with an optical imaging lens having five lens elements, in which the portion of embodiments have excessive air gap between the first lens element and the second lens element, which is unfavorable for endeavoring slimmer mobile devices, such as cell phones and digital cameras.

US Patent Publication No. 20100253829, and TW Patent Publication No. 2012013926 all disclosed an optical image lens constructed with an optical image lens having five lens elements, in which the total thickness of the five lens elements is excessive, which is unfavorable for endeavoring slimmer mobile devices, such as cell phones and digital cameras.

Especially, in US Patent Publication No. 20100254029, the length of the optical imaging lens is over 9.7 mm, which is not beneficial for the slimmer and smaller design of mobile devices.

Shortening the length of an optical imaging lens is one of the most important topics in the industry to pursue the trend of smaller and smaller mobile devices. Therefore, there is a need for an optical imaging lens having a shorter length and good optical characteristics.

BRIEF SUMMARY OF THE INVENTION

An object of the present invention is to provide a mobile device and an optical imaging lens thereof. By controlling the convex or concave shape of the surfaces of the lens elements, the length of the optical imaging lens can be shortened while sustaining good optical characteristics, such as high resolution and others.

In an exemplary embodiment, an optical imaging lens, sequentially from an object side to an image side, comprises first, second, third, fourth and fifth lens elements, each of the first, second, third, fourth, and fifth lens elements having an object-side surface facing toward the object side and an image-side surface facing toward the image side. The first lens element has positive refractive power, and the object-side surface thereof comprises a convex portion in a vicinity of an optical axis. The second lens element has negative refractive power, the object-side surface thereof comprises a convex portion in a vicinity of the optical axis, and said image-side surface thereof comprises a concave portion in a vicinity of the optical axis. The image-side surface of the third lens element comprises a convex portion in a vicinity of a periphery of the third lens element. The image-side surface of the fourth lens element comprises a convex portion in a vicinity of the optical axis; and the object-side surface of said fifth lens element comprises a convex portion in a vicinity of the optical axis, and the image-side surface of the fifth lens element comprises a concave portion in a vicinity of the optical axis and a convex portion in a vicinity of a periphery of the fifth lens element. The optical imaging lens as a whole comprising the five lens elements has refractive power, wherein the sum of the thickness of all five lens elements along the optical axis is referred to as "ALT," a central thickness of the first lens element along the optical axis is referred to as "$T_1$", and they satisfy the relation:

$$\frac{ALT}{T_1} \leq 4.$$

In another exemplary embodiment, other parameters of the optical imaging lens, such as the relations of the sum of all air gaps between the lens elements along the optical axis and each air gap between two adjacent lens elements along the optical axis, can be controlled. An example among them is controlling the sum of all air gaps from the first lens element to the fifth lens element along the optical axis, $G_{aa}$, and an air gap between the first lens element and the second lens element along the optical axis, $G_{12}$, to satisfy the relation:

$$11.5 \leq \frac{G_{aa}}{G_{12}}.$$

Another exemplary embodiment comprises controlling the air gap between the fourth lens element and the fifth lens element along the optical axis, $G_{45}$, and $G_{12}$ to satisfy the relation:

$$\frac{G_{45}}{G_{12}} \leq 5.5.$$

Yet, another exemplary embodiment comprises controlling the focal length of the third lens element, $f_3$, and the effective focal length of the optical imaging lens, f, to satisfy the relation:

$$0 < \frac{f_3}{f}.$$

Yet, another exemplary embodiment comprises controlling $G_{aa}$ and $T_1$ to satisfy the relation:

$$\frac{G_{aa}}{T_1} \leq 2.0.$$

Still another exemplary embodiment comprises controlling $T_1$ and $G_{12}$ to satisfy the relation:

$$6 \leq \frac{T_1}{G_{12}},$$

or $$9.5 \leq \frac{T_1}{G_{12}}.$$

Still another exemplary embodiment comprises controlling $G_{aa}$ to satisfy the relation:

$G_{aa} \leq 1.3$ mm.

Still another exemplary embodiment comprises controlling $G_{aa}$, ALT and $G_{12}$ to satisfy the relation:

$$5 \text{ mm}^{-1} \leq \frac{G_{aa}}{ALT \times G_{12}},$$

$$8 \text{ mm}^{-1} \leq \frac{G_{aa}}{ALT \times G_{12}},$$

or $$6.5 \text{ mm}^{-1} \leq \frac{G_{aa}}{ALT \times G_{12}}.$$

Still another exemplary embodiment comprises controlling $G_{aa}$, $G_{12}$ and $G_{45}$ to satisfy the relation:

$$\frac{G_{aa}}{G_{12} + G_{45}} \leq 5.5.$$

Aforesaid exemplary embodiments are not limited and could be selectively incorporated in other embodiments described herein.

In exemplary embodiments, an aperture stop is provided for adjusting the input of light of the system. For example, the aperture stop is selectively provided but not limited to be positioned at the object side of the first lens element.

In some exemplary embodiments, more details about the convex or concave surface structure and/or the refractive power could be incorporated for one specific lens element or broadly for plural lens elements to enhance the control for the system performance and/or resolution.

In another exemplary embodiment, a mobile device comprises a housing and an image module positioned in the housing. The image module comprises any of aforesaid exemplary embodiments of optical imaging lens, a lens barrel, a module housing unit, and an image sensor. The lens barrel is configured to provide a space where the optical imaging lens having five lens elements is positioned. The module housing unit is configured to provide a space where the lens barrel is positioned. The image sensor is positioned at the image-side of the optical imaging lens.

In exemplary embodiments, the module housing unit comprises, but is not limited to, an lens backseat, which comprises a first lens seat and a second lens seat, in which the first lens seat is positioned close to the outside of the lens barrel and is assembled along an axis, and the second lens seat is assembled along the axis and surrounding the outside of the first lens seat. The first lens seat could drive the lens barrel and the optical imaging lens having five lens elements therein to move along the axis.

In exemplary embodiments, the module housing unit further comprises, but is not limited to, an image sensor backseat positioned between the first lens seat, the second lens seat and the image sensor, and close to the second lens seat.

Through controlling the arrangement of the convex or concave shape of the surface of the lens element(s) and/or refractive power, the mobile device and the optical imaging lens thereof in aforesaid exemplary embodiments achieve good optical characteristics and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of the first embodiment of an optical imaging lens according to the present invention;

FIG. 5 is a table of aspherical data of the first embodiment of the optical imaging lens according to the present invention;

FIG. 8 is a table of optical data for each lens element of the optical imaging lens of the second embodiment of the present invention;

FIG. 9 is a table of aspherical data of the second embodiment of the optical imaging lens according to the present invention;

FIG. 12 is a table of optical data for each lens element of the optical imaging lens of the third embodiment of the present invention;

FIG. 13 is a table of aspherical data of the third embodiment of the optical imaging lens according to the present invention;

FIG. 16 is a table of optical data for each lens element of the optical imaging lens of the fourth embodiment of the present invention;

FIG. 17 is a table of aspherical data of the fourth embodiment of the optical imaging lens according to the present invention;

FIG. 20 is a table of optical data for each lens element of the optical imaging lens of the fifth embodiment of the present invention;

FIG. 21 is a table of aspherical data of a fifth embodiment of the optical imaging lens according to the present invention;

FIG. 24 is a table of optical data for each lens element of the optical imaging lens of the sixth embodiment of the present invention;

FIG. 25 is a table of aspherical data of the sixth embodiment of the optical imaging lens according to the present invention;

FIG. 26 is a table for the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

Figure 27:
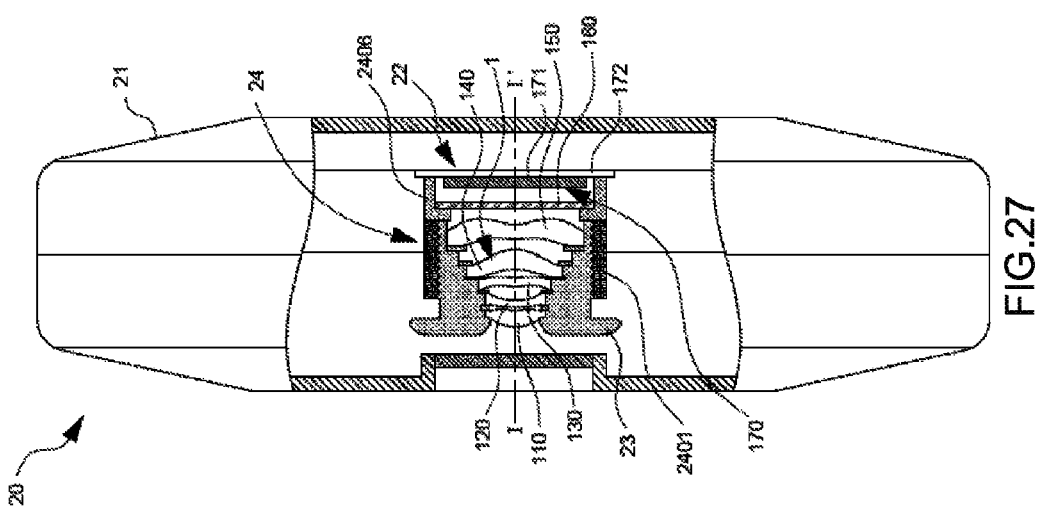

of all six example embodiments;

FIG. 27 is a structure of an example embodiment of a mobile device; and

Figure 28:
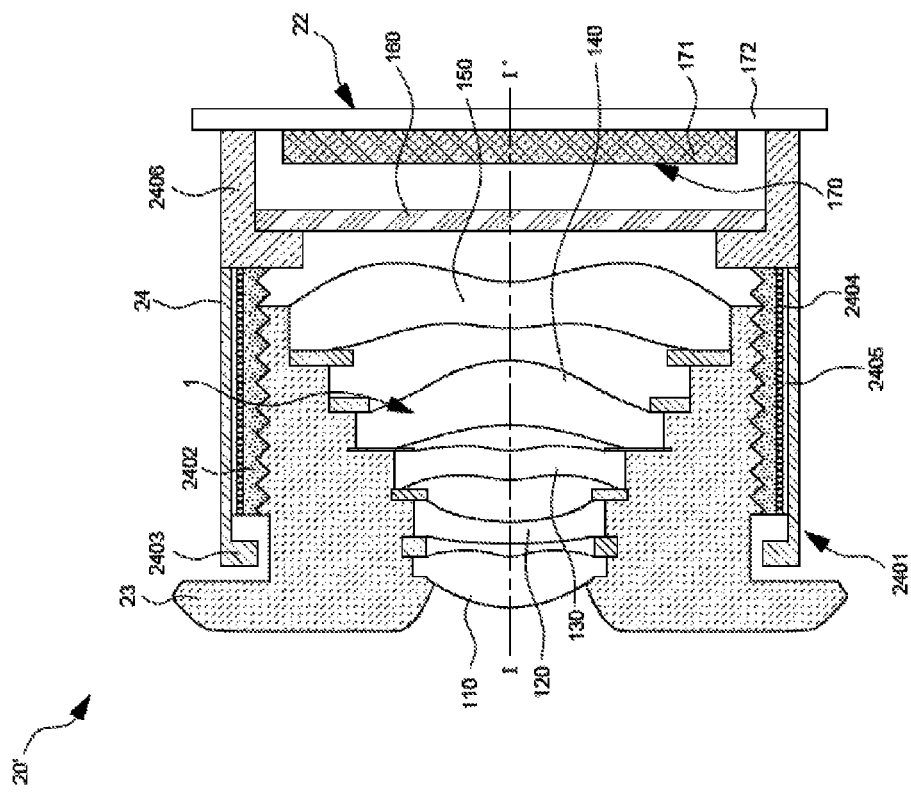

FIG. 28 is a partially enlarged view of the structure of another example embodiment of a mobile device.

DETAILED DESCRIPTION OF THE INVENTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosure and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise a first lens element, a second lens element, a third lens element, a fourth lens element, and a fifth lens element, each of the lens elements has an object-side surface facing toward the object side and an image-side surface facing toward the image side. These lens elements may be arranged sequentially from an object side to an image side, and example embodiments of the optical imaging lens as a whole may comprise the five lens elements having refractive power. By controlling the convex or concave shape and/or the refractive power characteristics of the surfaces of the lens elements, etc., the length of the optical imaging lens may be shortened while providing good optical performance. In an example embodiment: the first lens element has positive refractive power, and the object-side surface thereof comprises a convex portion in a vicinity of an optical axis; the second lens element has negative refractive power, the object-side surface thereof comprises a convex portion in a vicinity of the optical axis, and the image-side surface thereof comprises a concave portion in a vicinity of the optical axis; the image-side surface of the third lens element comprises a convex portion in a vicinity of a periphery of the third lens element; the image-side surface of the fourth lens element comprises a convex portion in a vicinity of the optical axis; and the object-side surface of the fifth lens element comprises a convex portion in a vicinity of the optical axis, and the image-side surface of the fifth lens element comprises a concave portion in a vicinity of the optical axis and a convex portion in a vicinity of a periphery of the fifth lens element.

Each lens element with aforesaid design is considered about the optical characteristics and the lengths of the optical imaging lens. The first lens element having positive refractive power and an object-side surface comprising a convex portion in a vicinity of the optical axis has better light converge ability, and together with an aperture stop provided at the object side of the first lens element could effectively shorten the lengths of the optical imaging lens. The second lens element having negative refractive power and an object-side surface comprising a convex portion in a vicinity of the optical axis and an image-side surface thereof comprising a concave portion in a vicinity of the optical axis, and together with the third lens element comprising an image-side surface comprising a convex portion in a vicinity of a periphery of the third lens element could eliminate the aberration of the optical imaging lens. The fourth lens element comprising an image-side surface comprising a convex portion in a vicinity of the optical axis has better light converge ability. The fifth lens element comprising an object-side surface comprising a convex portion in a vicinity of the optical axis, and an image-side surface comprising a concave portion in a vicinity of the optical axis and a convex portion in a vicinity of a periphery of the fifth lens element could correct the field curvature of the optical imaging lens, reduce the high order aberration of the optical imaging lens, and depresses the angle of the chief ray (the incident angle of the light onto the image sensor), and then the sensitivity of the whole system is promoted to achieve good optical characteristics.

In another exemplary embodiment, a total thickness of all five lens elements, ALT, and a central thickness of the first lens element along the optical axis, $T_1$, satisfy the following equation:

$$\frac{ALT}{T_1} \leq 4. \qquad \text{Equation (1)}$$

Reference is now made to equation (1). A person having ordinary skill in the art would readily understand that the shortened ratio of ALT is larger than the shortened ratio of $T_1$. Since the first lens element has positive refractive power, the thickness of the first lens element should not be too thin. Otherwise, the light convergence effect of the optical imaging lens is insufficient. On the other hand, when the total thickness of all five lens elements ALT is shortened, it could also reduce the thickness of the lens elements besides the first lens element for more shortened length ratio. Therefore, the light convergence effect and the total length of the optical imaging lens have proper correlation if satisfying equation (1). Considering a reasonable optical imaging lens length, equation (1) may be further restricted by a lower limit, for example but not limited to, as follows:

$$3 \leq \frac{ALT}{T_1} \leq 4. \qquad \text{Equation (1')}$$

In another exemplary embodiment, the relations of the sum of all air gaps between the lens elements along the optical axis and each air gap between two adjacent lens element along the optical axis could be controlled, and an example among them is controlling the sum of all air gaps from the first lens element to the fifth lens element along the optical axis, $G_{aa}$, and an air gap between the first lens element and the second lens element along the optical axis, $G_{12}$, to satisfy the following equation:

$$11.5 \leq \frac{G_{aa}}{G_{12}}. \qquad \text{Equation (2)}$$

Reference is now made to equation (2). A person having ordinary skill in the art would readily understand that the shortened ratio of $G_{aa}$ is smaller than the shortened ratio of $G_{12}$. Since the object-side surface of the second lens element comprises a convex portion in a vicinity of the optical axis, the distance from the first lens element to the second lens element could be more shortened, such that it could effectively shorten the length of the optical imaging lens. Considering a reasonable optical imaging lens length, equation (2) may be further restricted by a upper limit, for example but not limited to, as follows:

$$11.5 \leq \frac{G_{aa}}{G_{12}} \leq 25. \qquad \text{Equation (2')}$$

In another exemplary embodiment, the air gap between the fourth lens element and the fifth lens element along the optical axis, $G_{45}$, and $G_{12}$ satisfy the following equation:

$$\frac{G_{45}}{G_{12}} \leq 5.5. \qquad \text{Equation (3)}$$

Reference is now made to equation (3). A person having ordinary skill in the art would readily understand that the shortened optical imaging lens length of $G_{45}$ is larger than the shortened range of $G_{12}$. Since the image-side surface of the fourth lens element comprises a convex portion in a vicinity of the optical axis and the object-side surface of the fifth lens element comprises a convex portion in a vicinity of the optical axis, the shortened range of $G_{45}$ is larger than the shortened range of $G_{12}$, which is proper arrangement for shortening the length of the optical imaging lens. Considering a reasonable optical imaging lens length, equation (3) may be further restricted by a upper limit, for example but not limited to, as follows:

$$0.8 \leq \frac{G_{45}}{G_{12}} \leq 5.5. \qquad \text{Equation (3')}$$

As all mentioned above, the shortened ratios of $G_{12}$ and $G_{45}$ are larger than the shortened ratios of other air gaps during the process of shortening the length of the optical imaging lens.

In another exemplary embodiment, the focal length of the third lens element, $f_3$, and the effective focal length of the optical imaging lens, f, satisfy the following equation:

$$0 < \frac{f_3}{f}. \qquad \text{Equation (4)}$$

Reference is now made to equation (4). A person having ordinary skill in the art would readily understand that the third lens element, the first lens element, and the second lens element are constructed in positive, negative, and positive structure symmetrically, which has better aberration elimination ability.

In another exemplary embodiment, $G_{aa}$ and $T_1$ satisfy the following equation:

$$\frac{G_{aa}}{T_1} \leq 2.0. \qquad \text{Equation (5)}$$

Reference is now made to equation (5). A person having ordinary skill in the art would readily understand when $T_1$ becomes longer, it indicates the light converge ability of the first lens element is better. Accordingly, when the light emitted from the first lens element incident to the second lens element at the same height, $G_{12}$ is shortened as well as $G_{aa}$ is shortened, which is favorable for shortening the length of the optical imaging lens. Considering a reasonable optical imaging lens length, equation (3) may be further restricted by a upper limit, for example but not limited to, as follows:

$$1 \leq \frac{G_{aa}}{T_1} \leq 2.0. \qquad \text{Equation (5')}$$

Preferably, $G_{aa}$ and $T_1$ may further satisfy the following equation:

$$1.3 \le \frac{G_{aa}}{T_1} \le 2.0 \qquad \text{Equation (5'')}$$

In another exemplary embodiment, $T_1$ and $G_{12}$ satisfy the following equation:

$$6 \le \frac{T_1}{G_{12}} \qquad \text{Equation (6)}$$

Reference is now made to equation (6). A person having ordinary skill in the art would readily understand when considering the light converge ability of the first lens element and the height of the incident light to the second lens element, the arrangement of $T_1$ and $G_{12}$ in the proper range could reduce the length of the optical imaging lens and maintain good optical characteristics.

Preferably, $T_1$ and $G_{12}$ may further satisfy the following equation:

$$9.5 \le \frac{T_1}{G_{12}} \qquad \text{Equation (6')}$$

Considering a reasonable optical imaging lens length, equation (6) may be further restricted by an upper limit, for example but not limited to, as follows:

$$6 \le \frac{T_1}{G_{12}} \le 17. \qquad \text{Equation (6'')}$$

In another exemplary embodiment, $G_{aa}$ satisfies the following equation:

$$G_{aa} \le 1.3 \text{ mm} \qquad \text{Equation (7)}.$$

Reference is now made to equation (7). A person having ordinary skill in the art would readily understand $G_{aa}$ should not be excessive, otherwise the length of the optical imaging lens could not be shortened. However, if $G_{aa}$ is too small, the production difficulty is quite high. Accordingly, $G_{aa}$ may be preferably further restricted by a lower limit, for example but not limited to, as follows:

$$0.65 \text{ mm} \le G_{aa} \le 1.3 \text{ mm} \qquad \text{Equation (7')}.$$

In another exemplary embodiment, $G_{aa}$, ALT, and $G_{12}$ satisfy the following equation:

$$5 \text{ mm}^{-1} \le \frac{G_{aa}}{ALT \times G_{12}}. \qquad \text{Equation (8)}$$

Reference is now made to equation (8). A person having ordinary skill in the art would readily understand $G_{aa}$, ALT, and $G_{12}$ are determined in the proper range based on the preferable length of the optical imaging lens, otherwise, it is unfavorable for reducing the length of the optical imaging lens if ALT, and $G_{12}$ are excessive.

$G_{aa}$, ALT, and $G_{12}$ may preferably satisfy the following equations:

$$6.5 \text{ mm}^{-1} \le \frac{G_{aa}}{ALT \times G_{12}}; \qquad \text{Equation (8')}$$

or $$8 \text{ mm}^{-1} \le \frac{G_{aa}}{ALT \times G_{12}}. \qquad \text{Equation (8'')}$$

Furthermore, Equation (8) may be preferably further restricted by an upper limit, for example but not limited to, as follows:

$$5 \text{ mm}^{-1} \le \frac{G_{aa}}{ALT \times G_{12}} \le 13.5 \text{ mm}^{-1}. \qquad \text{Equation (8''')}$$

In another exemplary embodiment, $G_{aa}$, $G_{12}$, and $G_{45}$ satisfy the following equation:

$$\frac{G_{aa}}{G_{12} + G_{45}} \le 5.5 \qquad \text{Equation (9)}$$

Reference is now made to equation (9). A person having ordinary skill in the art would readily understand $G_{12}$ and $G_{45}$ are two smaller air gap in the arrangement of the optical imaging lens, however, if $G_{12}$ and $G_{45}$ are too small, the production difficulty is quite high. Therefore, $G_{aa}$, $G_{12}$, and $G_{45}$ have proper correlation if satisfying equation (9).

Equation (9) may be preferably further restricted by a lower limit, for example but not limited to, as follows:

$$2 \le \frac{G_{aa}}{G_{12} + G_{45}} \le 5.5 \qquad \text{Equation (9')}$$

When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 1:
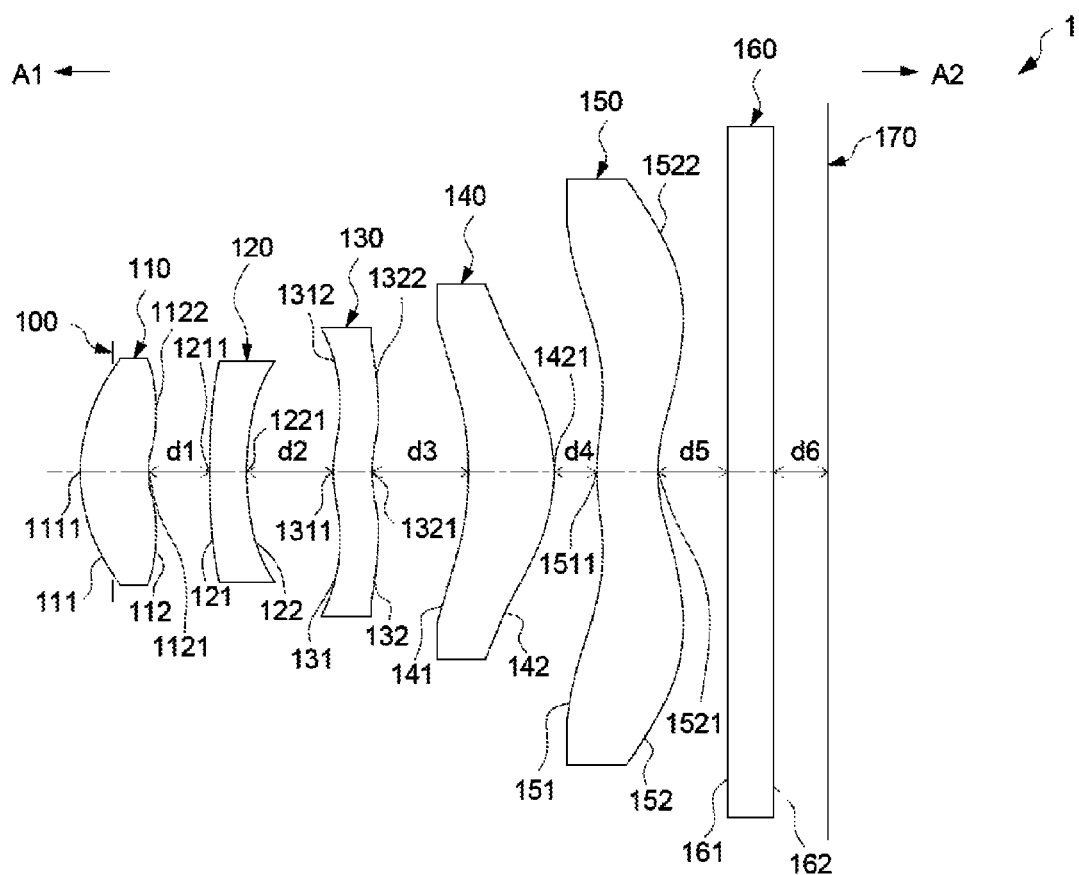
FIG. 1 is a cross-sectional view of a first embodiment of an optical imaging lens having five lens elements according to the present invention.
Figure 2:
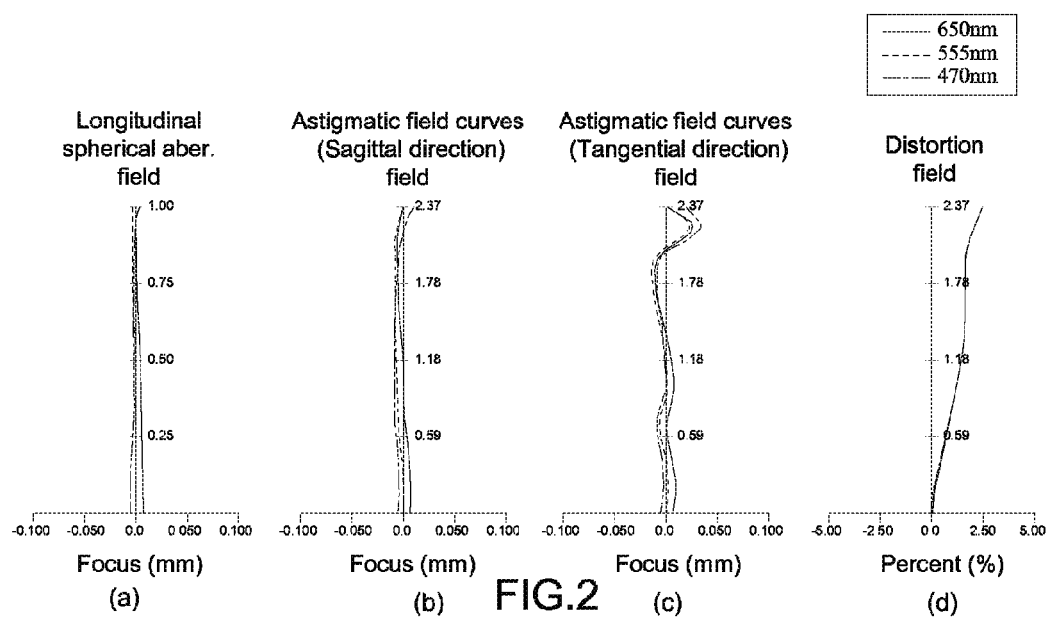
FIG. 2 is a chart of longitudinal spherical aberration and other kinds of optical aberrations of the first embodiment of the optical imaging lens according to the present disclosure.
Figure 3:
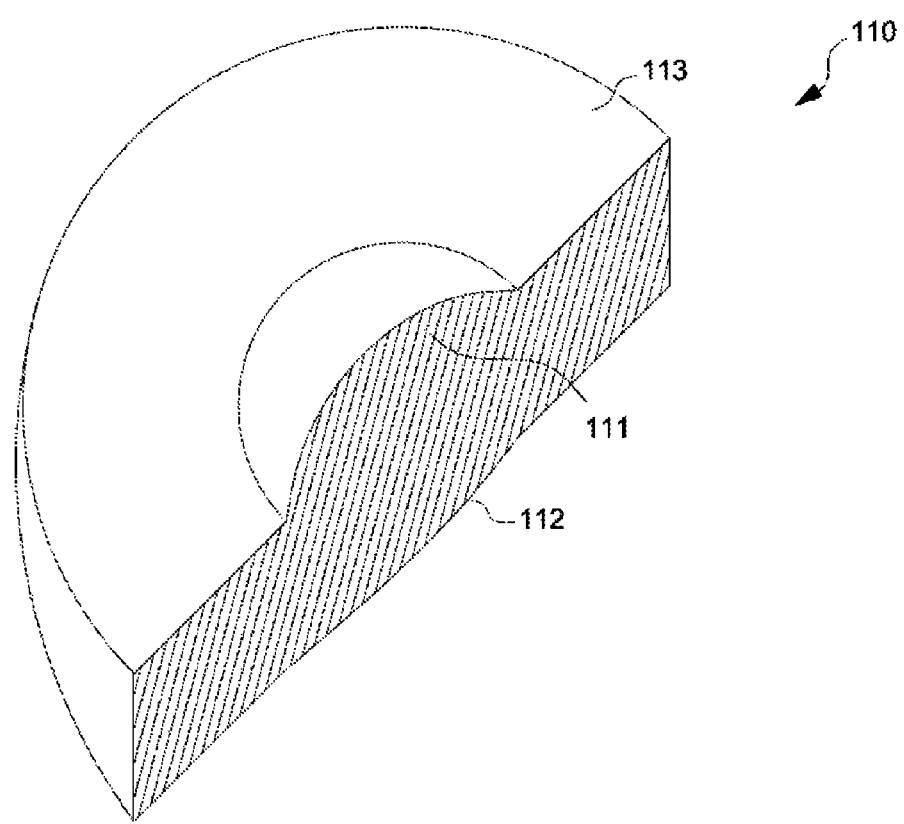
FIG. 3 is a cross-sectional view of a lens element of the optical imaging lens of an example embodiment of the present invention.

Several exemplary embodiments and associated optical data will now be provided for illustrating example embodiments of optical imaging lens with good optical characteristics and a shortened length. Reference is now made to FIGS. 1-5. FIG. 1 illustrates an example cross-sectional view of an optical imaging lens 1 having five lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2, an aperture stop 100, a first lens element 110, a second lens element 120, a third lens element 130, and a fourth lens element 140, and a fifth lens 150. A filtering unit 160 and an image plane 170 of an image sensor are positioned at the image side A2 of the optical image lens 1. More specifically, the filtering unit 160 is positioned between the fifth lens 150 and the image plane 170 of the image sensor. The filtering unit 160, having an object-side surface 161 and an image-side surface 162, filters light with specific wavelength from the light passing optical imaging lens 1. For example, IR light is filtered or selectively absorbed by the filtering unit 160, and this will prohibit the IR light which is not seen by human eyes from producing an image on the image plane 170 of the image sensor.

Exemplary embodiments of each lens element of the optical imaging lens 1 will now be described with reference to the drawings. Detail about the structure of each lens element of the optical imaging lens 1 is provided below.

Each of the first, second, third, fourth, and fifth lens elements 110, 120, 130, 140, 150 has a respective object-side surface 111, 121, 131, 141, 151 facing toward the object side A1 and a respective image-side surface 112, 122, 132, 142, 152 facing toward the image side A2. The aperture stop 100 is positioned in front of the first lens element 110. The first lens element 110 has positive refractive power and may be made of plastic material. The object-side surface 111 is a convex surface, which comprises a convex portion 1111 in a vicinity of the optical axis. The image-side surface 112 comprises a concave portion 1121 in a vicinity of the optical axis, and a convex portion 1122 in a vicinity of a periphery of the first lens element 110. The object-side surface 111 and the image-side surface 112 may be both aspherical surfaces.

The second lens element 120 has negative refractive power and may be made of plastic material. The object-side surface 121 is a convex surface, which comprises a convex portion 1211 in a vicinity of the optical axis. The image-side surface 122 is a concave surface, which comprises a concave portion 1221 in a vicinity of the optical axis. The object-side surface 121 and the image-side surface 122 may be both aspherical surfaces.

The third lens element 130 may have positive refractive power and may be made of plastic material. The object-side surface 131 comprises a convex portion 1311 in a vicinity of the optical axis and a concave portion 1312 in a vicinity of a periphery of the third lens element 130. The image-side surface 132 comprises a concave portion 1321 in a vicinity of the optical axis, and a convex portion 1322 in a vicinity of a periphery of the third lens element 130. The object-side surface 131 and the image-side surface 132 may be both aspherical surfaces.

The fourth lens element 140 may have positive refractive power and may be made of plastic material. The object-side surface 141 is a concave surface. The image-side surface 142 is a convex surface, which comprises a convex portion 1421 in a vicinity of the optical axis. The object-side surface 141 and the image-side surface 142 may be both aspherical surfaces.

The fifth lens element 150 may have negative refractive power and may be made of plastic material. The object-side surface 151 comprises a convex portion 1511 in a vicinity of the optical axis. The image-side surface 152 comprises a concave portion 1521 in a vicinity of the optical axis, and a convex portion 1522 in a vicinity of a periphery of the fifth lens element 150. The object-side surface 151 and the image-side surface 152 may be both aspherical surfaces.

In example embodiments, air gaps exist between the lens elements 110-150, the filtering unit 160, and the image plane 170 of the image sensor. For example, FIG. 1 illustrates the air gaps d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by $G_{12}$, the air gap d3 is denoted by $G_{34}$, and the sum of all air gaps d1, d2, d3, d4 between the first though fifth lens elements is denoted by $G_{aa}$.

FIG. 4 depicts the optical characteristics of each lens elements in the optical imaging lens 1 of the present invention, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

are:

$$\frac{ALT}{T_1} = 3.92,$$

satisfying equations (1), and (1');

$$\frac{G_{aa}}{G_{12}} = 16.78,$$

satisfying equations (2), and (2');

$$\frac{G_{45}}{G_{12}} = 5.42,$$

satisfying equations (3), and (3');

$$\frac{f_3}{f} = 38.26,$$

satisfying equations (4);

$$\frac{G_{aa}}{T_1} = 1.76,$$

satisfying equations (5), (5'), and (5");

$$\frac{T_1}{G_{12}} = 9.53,$$

satisfying equations (6), (6'), and (6");

$G_{aa}$=0.86 mm, satisfying equations (7), and (7');

$$\frac{G_{aa}}{ALT \times G_{12}} = 8.74 \text{ mm}^{-1},$$

satisfying equations (8), (8'), (8''), and (8'''); and $$\frac{G_{aa}}{G_{12} + G_{45}} = 2.61,$$

satisfying equations (9), and (9').

The distance from the object-side surface 111 of the first lens element 110 to the image plane 170 is 3.68 mm, and the length of the optical imaging lens 1 is indeed shortened.

Please note that, in example embodiments, to clearly illustrate the structure of each lens element, only the part where light passes, is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side surface 111 and the image-side surface 112 to the edge of the first lens element 110 for mounting the first lens element 110 in the optical imaging lens 1, and ideally, light for imaging will not pass through the protruding part 113.

Please note that, in example embodiments, to clearly illustrate the structure of each lens element, only the part where light passes, is shown. For example, taking the first lens element 110 as an example, FIG. 1 illustrates the object-side surface 111 and the image-side surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side surface 111 and the image-side surface 112 to the edge of the first lens element 110 for mounting the first lens element 110 in the optical imaging lens 1, and ideally, light for imaging will not pass through the protruding part 113.

The aspherical surfaces, including the object-side surfaces 111, 121, 131, 141, 151 and the image-side surfaces 112, 122, 132, 142, 152 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of the surface of the lens element;
Z represents the depth of the aspherical surface (the perpendicular distance between the point of the aspherical surface at a distance Y from the optical axis and the tangent plane of the vertex on the optical axis of the aspherical surface);
Y represents the perpendicular distance between the point of the aspherical surface and the optical axis;
K represents a conic constant; and
$a_{2i}$ represents a aspherical coefficient of $2i^{th}$ order.

The values of each aspherical parameter, K, and $a_4$~$a_{12}$ of each lens element 110, 120, 130, 140, 150 are represented in FIG. 5.

As illustrated in FIG. 2, the optical imaging lens 1 of the present example embodiment shows great characteristics in the longitudinal spherical aberration (a), astigmatism aberration in the sagittal direction (b), astigmatism aberration in the tangential direction (c), and distortion aberration (d). Therefore, according to above illustration, the optical imaging lens 1 of the example embodiment indeed achieves great optical performance and the length of the optical imaging lens 1 is effectively shortened.

Figure 6:
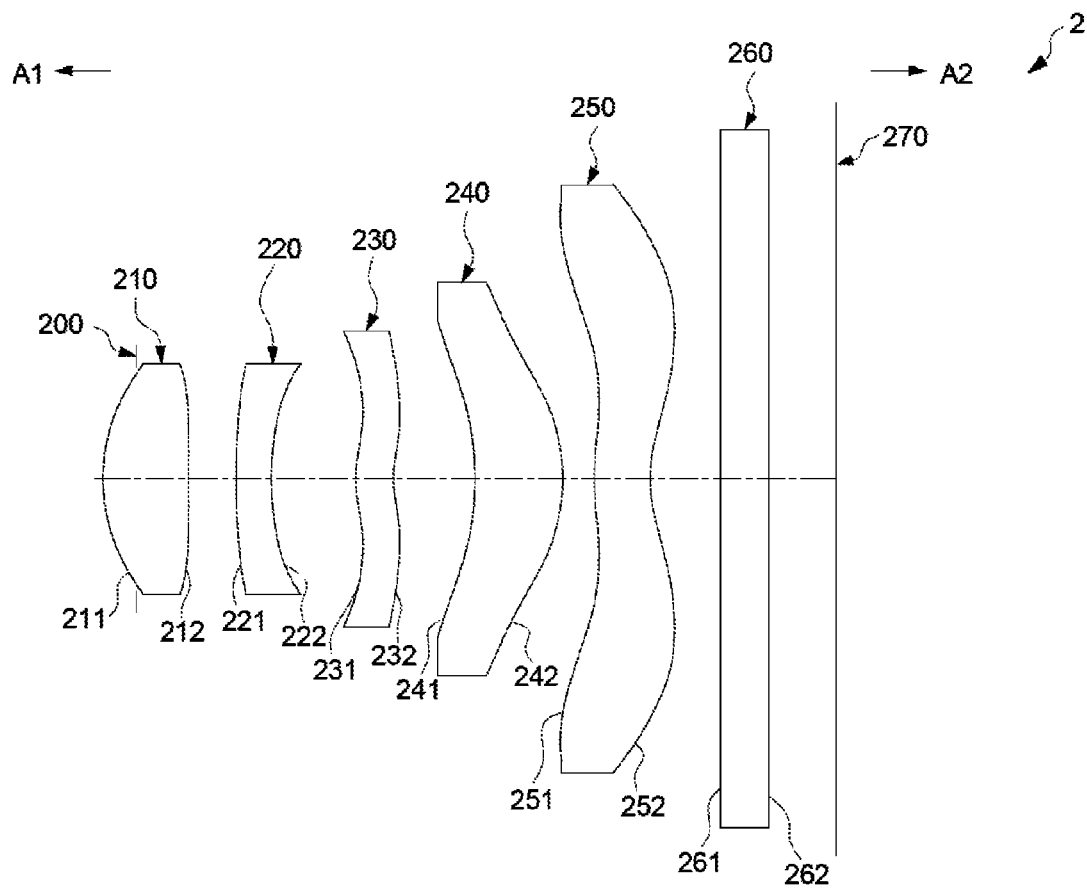
FIG. 6 is a cross-sectional view of a second embodiment of an optical imaging lens having five lens elements according to the present invention.
Figure 7:
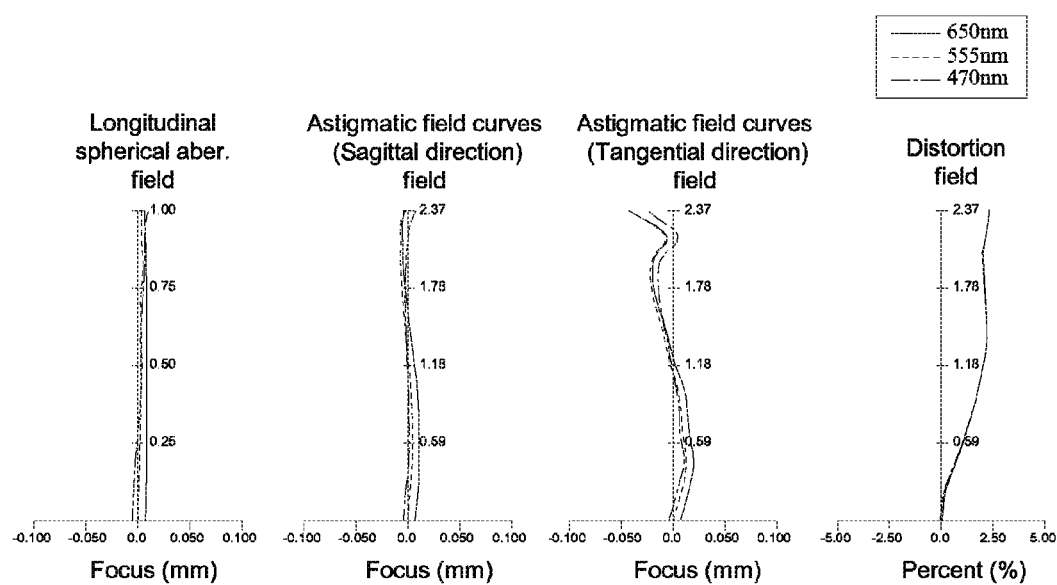
FIG. 7 is a chart of longitudinal spherical aberration and other kinds of optical aberrations of the second embodiment of the optical imaging lens according to the present invention.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to an example embodiment. FIG. 8 shows an example table of optical data of each lens element of the optical imaging lens 2 according to the second example embodiment. FIG. 9 shows an example table of aspherical data of the optical imaging lens 2 according to the second example embodiment.

As shown in FIG. 6, the second embodiment is similar to the first embodiment. The optical imaging lens 2, in an order from an object side A1 to an image side A2, comprises an aperture stop 200, first lens element to fifth lens element 210-250. A filtering unit 260 and an image plane 270 of an image sensor are positioned at the image side A2 of the optical imaging lens 2. The arrangement of the convex or concave surface structures, including the object-side surfaces 211-251 and image-side surfaces 212-252, and the refractive power of the lens elements 210-250 is same with the optical imaging lens 1. The difference between the optical imaging lens 1 and the optical imaging lens 2 is the image-side surface 212 of the optical imaging lens 2 is a convex surface. Additionally, the values of the central thicknesses of the lens elements 210-250 and the air gaps between the lens elements 210-250 are slight different from the values of the optical imaging lens 1.

Please refer to FIG. 8 for the optical characteristics of each lens elements in the optical imaging lens 2 of the present embodiment, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

are:

$$\frac{ALT}{T_1} = 3.50,$$

satisfying equations (1), and (1');

$$\frac{G_{aa}}{G_{12}} = 23.00,$$

satisfying equations (2), and (2');

$$\frac{G_{45}}{G_{12}} = 5.50,$$

satisfying equations (3), and (3');

$$\frac{f_3}{f} = 19.80,$$

satisfying equations (4);

$$\frac{G_{aa}}{T_1} = 1.52,$$

satisfying equations (5), (5'), and (5");

$$\frac{T_1}{G_{12}} = 15.10,$$

satisfying equations (6), (6'), and (6");
$G_{aa}$=0.83 mm, satisfying equations (7), and (7');

$$\frac{G_{aa}}{ALT \times G_{12}} = 12.09 \text{ mm}^{-1},$$

satisfying equations (8), (8'), (8"), and (8'"); and $$\frac{G_{aa}}{G_{12} + G_{45}} = 3.54,$$

satisfying equations (9), and (9').

The distance from the object-side surface 211 of the first lens element 210 to the image plane 270 is 3.69 mm, and the length of the optical imaging lens 2 is indeed shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
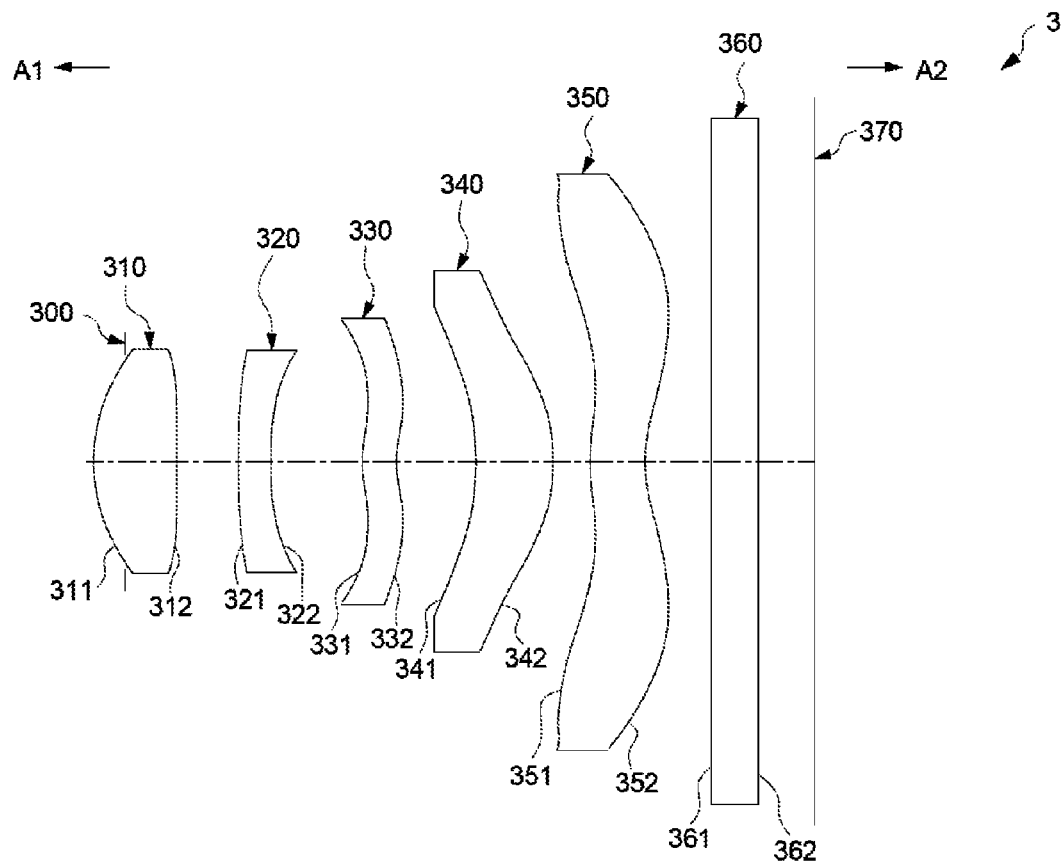
FIG. 10 is a cross-sectional view of a third embodiment of an optical imaging lens having five lens elements according to the present invention.
Figure 11:
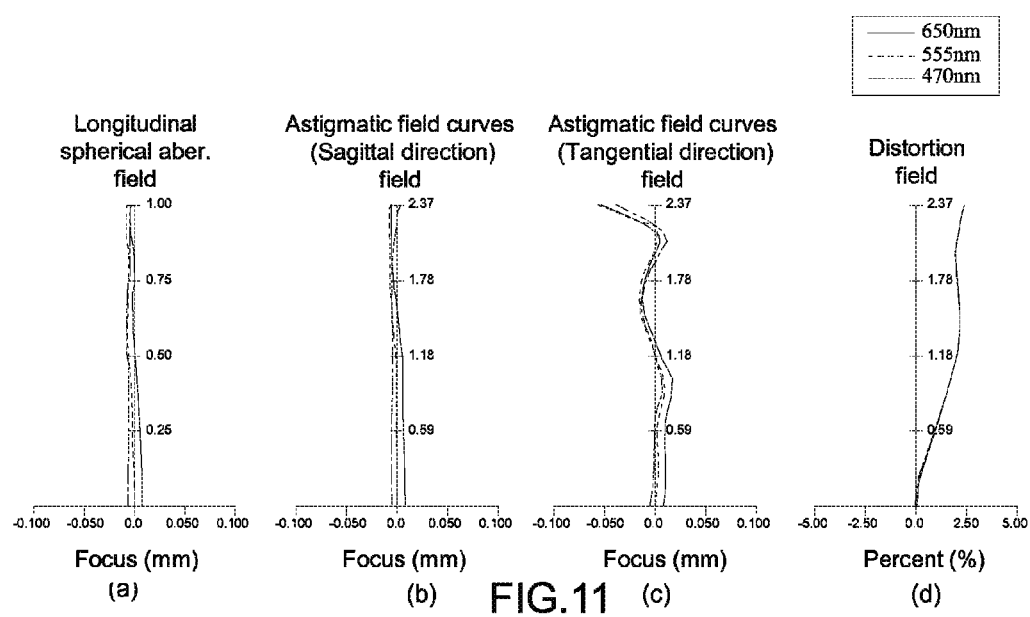
FIG. 11 is a chart of longitudinal spherical aberration and other kinds of optical aberrations of the third embodiment of the optical imaging lens according the present invention.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to an example embodiment. FIG. 12 shows an example table of optical data of each lens element of the optical imaging lens 3 according to the third example embodiment. FIG. 13 shows an example table of aspherical data of the optical imaging lens 3 according to the third example embodiment.

As shown in FIG. 10, the third embodiment is similar to the first embodiment. The optical imaging lens 3, in an order from an object side A1 to an image side A2, comprises an aperture stop 300, first lens element to fifth lens element 310-350. A filtering unit 360 and an image plane 370 of an image sensor are positioned at the image side A2 of the optical imaging lens 3. The arrangement of the convex or concave surface structures, including the object-side surfaces 311-351 and image-side surfaces 312-352, and the refractive power of the lens elements 310-350 is same with the optical imaging lens 1. The difference between the optical imaging lens 1 and the optical imaging lens 3 is the image-side surface 312 of the optical imaging lens 3 is a convex surface. Additionally, the values of the central thicknesses of the lens elements 310-350 and the air gaps between the lens elements 310-350 are slight different from the values of the optical imaging lens 1.

Please refer to FIG. 12 for the optical characteristics of each lens elements in the optical imaging lens 2 of the present embodiment, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

are:

$$\frac{ALT}{T_1} = 3.10,$$

satisfying equations (1), and (1');

$$\frac{G_{aa}}{G_{12}} = 18.94,$$

satisfying equations (2), and (2');

$$\frac{G_{45}}{G_{12}} = 5.24,$$

satisfying equations (3), and (3');

$$\frac{f_3}{f} = 8.66,$$

satisfying equations (4);

$$\frac{G_{aa}}{T_1} = 1.41,$$

satisfying equations (5), (5'), and (5");

$$\frac{T_1}{G_{12}} = 13.46,$$

satisfying equations (6), (6'), and (6");
$G_{aa}$=0.87 mm, satisfying equations (7), and (7');

$$\frac{G_{aa}}{ALT \times G_{12}} = 9.87 \text{ mm}^{-1},$$

satisfying equations (8), (8'), (8"), and (8'"); and $$\frac{G_{aa}}{G_{12} + G_{45}} = 3.04,$$

satisfying equations (9), and (9').

The distance from the object-side surface 311 of the first lens element 310 to the image plane 370 is 3.69 mm, and the length of the optical imaging lens 3 is indeed shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
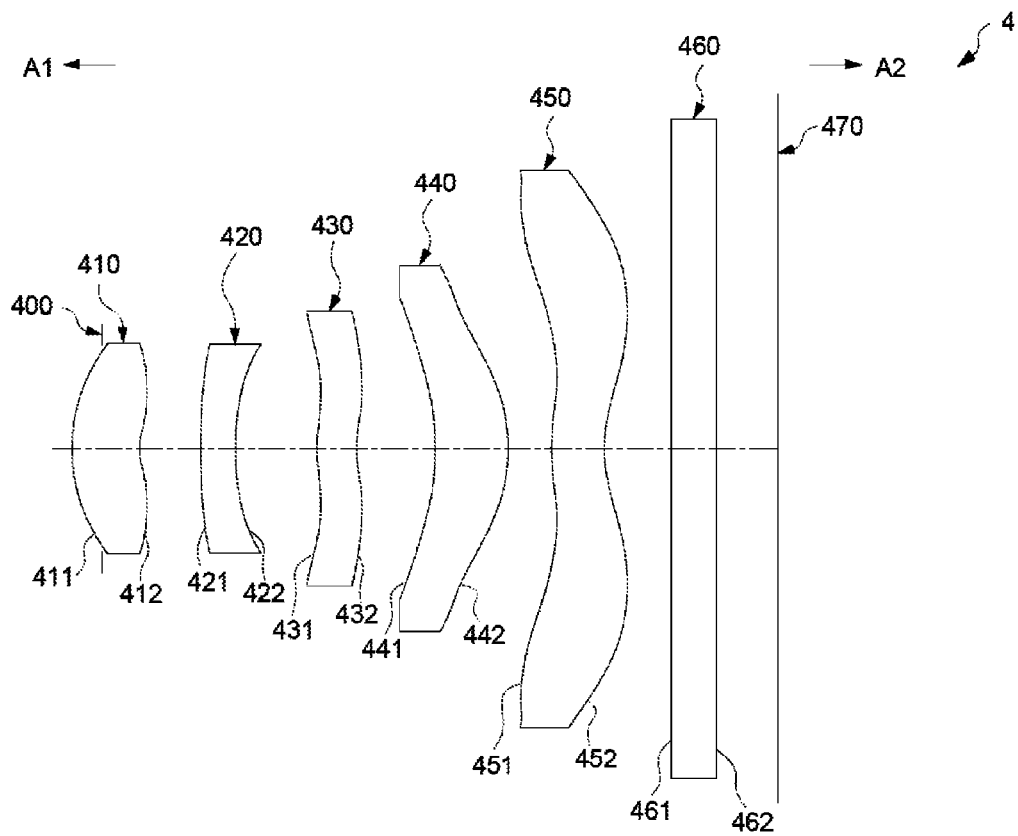
FIG. 14 is a cross-sectional view of a fourth embodiment of an optical imaging lens having five lens elements according to the present invention.
Figure 15:
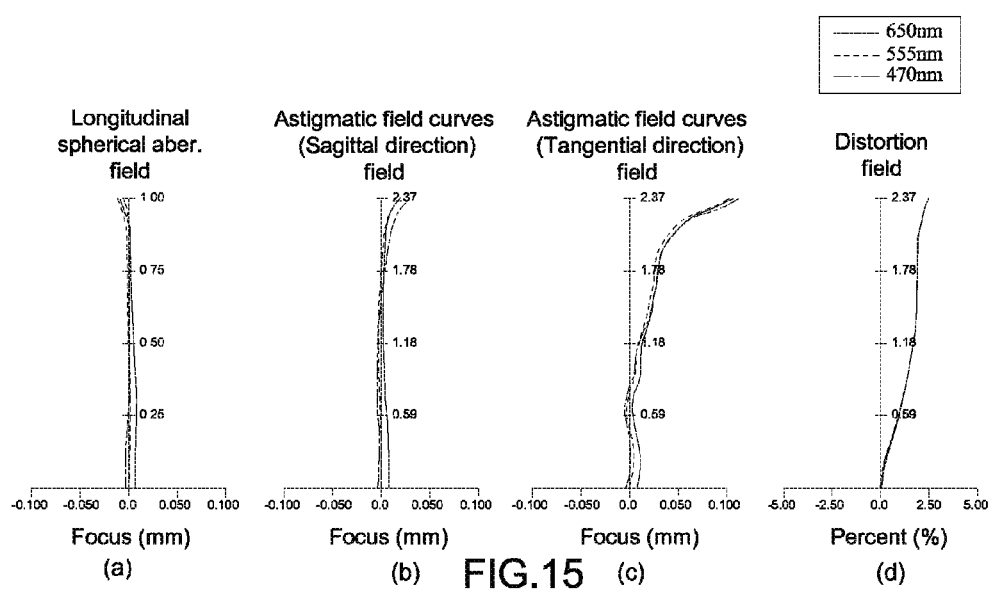
FIG. 15 is a chart of longitudinal spherical aberration and other kinds of optical aberrations of the fourth embodiment of the optical imaging lens according the present invention.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to an example embodiment. FIG. 16 shows an example table of optical data of each lens element of the optical imaging lens 4 according to the fourth example embodiment. FIG. 17 shows an example table of aspherical data of the optical imaging lens 2 according to the fourth example embodiment.

As shown in FIG. 14, the fourth embodiment is similar to the first embodiment. The optical imaging lens 2, in an order from an object side A1 to an image side A2, comprises an aperture stop 400, first lens element to fifth lens element 410-450. A filtering unit 460 and an image plane 470 of an image sensor are positioned at the image side A2 of the optical imaging lens 4. The arrangement of the convex or concave surface structures, including the object-side surfaces 411-451 and image-side surfaces 412-452, and the refractive power of the lens elements 410-450 is same with the optical imaging lens 1. The difference between the optical imaging lens 1 and the optical imaging lens 4 the values of the central thicknesses of the lens elements 410-450 and the air gaps between the lens elements 410-450 are slight different from the values of the optical imaging lens 1.

Please refer to FIG. 16 for the optical characteristics of each lens elements in the optical imaging lens 4 of the present embodiment, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

are:

$$\frac{ALT}{T_1} = 3.71,$$

satisfying equations (1), and (1');

$$\frac{G_{aa}}{G_{12}} = 14.02,$$

satisfying equations (2), and (2');

$$\frac{G_{45}}{G_{12}} = 4.45,$$

satisfying equations (3), and (3');

$$\frac{f_3}{f} = 6.22,$$

satisfying equations (4);

$$\frac{G_{aa}}{T_1} = 1.82,$$

satisfying equations (5), (5'), and (5");

$$\frac{T_1}{G_{12}} = 7.7,$$

satisfying equations (6), and (6");
$G_{aa}$=0.91 mm, satisfying equations (7), and (7');

$$\frac{G_{aa}}{ALT \times G_{12}} = 7.55 \text{ mm}^{-1},$$

satisfying equations (8), (8'), and (8'''); and $$\frac{G_{aa}}{G_{12} + G_{45}} = 2.57,$$

satisfying equations (9), and (9').

The distance from the object-side surface 411 of the first lens element 410 to the image plane 470 is 3.63 mm, and the length of the optical imaging lens 4 is indeed shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
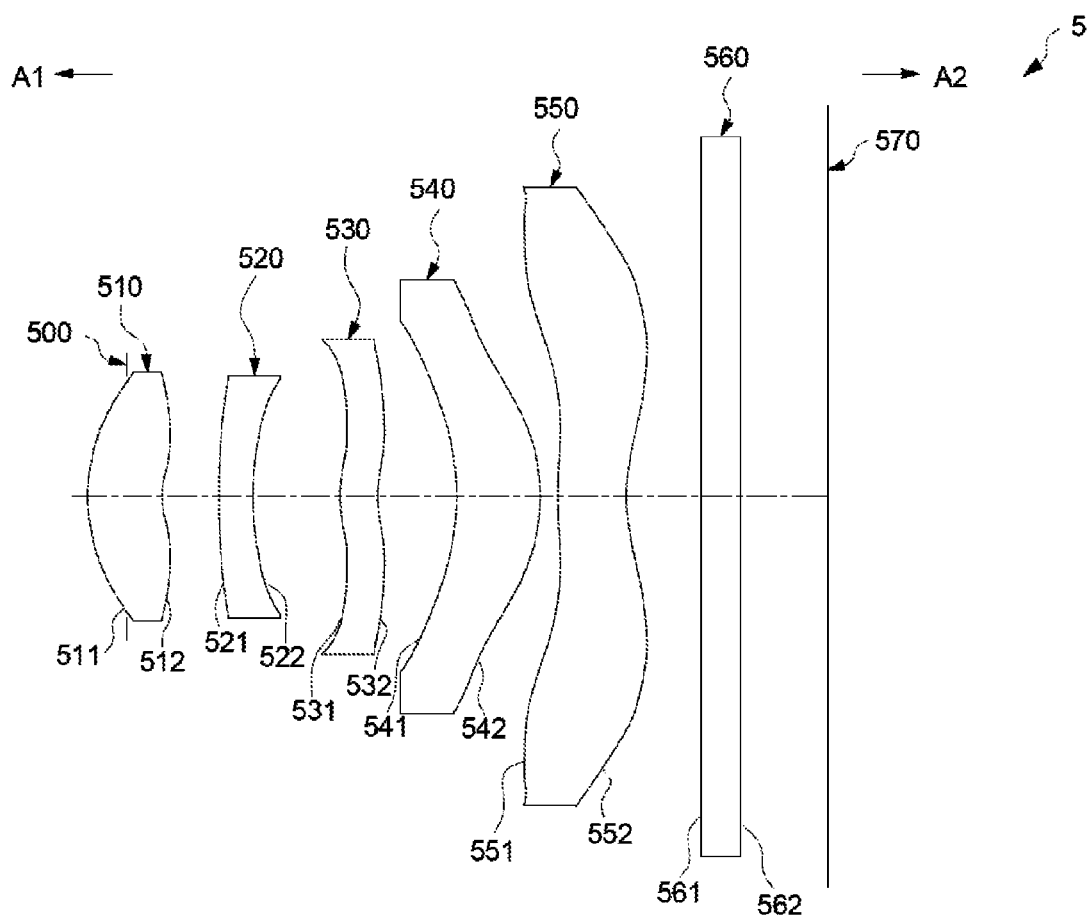
FIG. 18 is a cross-sectional view of a fifth embodiment of an optical imaging lens having five lens elements according to the present invention.
Figure 19:
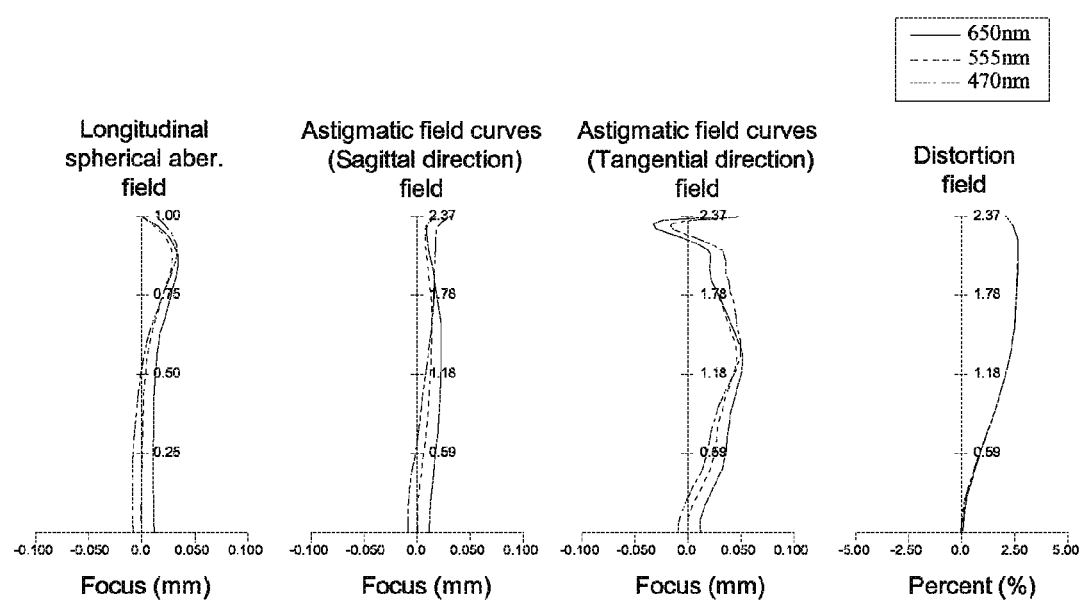
FIG. 19 is a chart of longitudinal spherical aberration and other kinds of optical aberrations of the fifth embodiment of the optical imaging lens according the present invention.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to an example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment.

As shown in FIG. 18, the fifth embodiment is similar to the first embodiment. The optical imaging lens 5, in an order from an object side A1 to an image side A2, comprises an aperture stop 500, first lens element to fifth lens element 510-550. A filtering unit 560 and an image plane 570 of an image sensor are positioned at the image side A2 of the optical imaging lens 5. The arrangement of the convex or concave surface structures, including the object-side surfaces 511-551 and image-side surfaces 512-552, and the refractive power of the lens elements 510-550 is same with the optical imaging lens 1. The difference between the optical imaging lens 1 and the optical imaging lens 5 is the values of the central thicknesses of the lens elements 510-550 and the air gaps between the lens elements 510-550 are slight different from the values of the optical imaging lens 1.

Please refer to FIG. 20 for the optical characteristics of each lens elements in the optical imaging lens 5 of the present embodiment, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12}+G_{45}}$$

are:

$$\frac{ALT}{T_1} = 3.69,$$

satisfying equations (1), and (1');

$$\frac{G_{aa}}{G_{12}} = 11.50,$$

satisfying equations (2), and (2');

$$\frac{G_{45}}{G_{12}} = 1.30,$$

satisfying equations (3), and (3');

$$\frac{f_3}{f} = 6.22,$$

satisfying equations (4);

$$\frac{G_{aa}}{T_1} = 1.85,$$

satisfying equations (5), (5'), and (5");

$$\frac{T_1}{G_{12}} = 6.21,$$

satisfying equations (6), and (6");

$G_{aa}$=1.15 mm, satisfying equations (7), and (7');

$$\frac{G_{aa}}{ALT \times G_{12}} = 5.02 \text{ mm}^{-1},$$

satisfying equations (8), and (8'''); and $$\frac{G_{aa}}{G_{12}+G_{45}} = 5.00,$$

satisfying equations (9), and (9').

The distance from the object-side surface 511 of the first lens element 510 to the image plane 570 is 4.49 mm, and the length of the optical imaging lens 5 is indeed shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
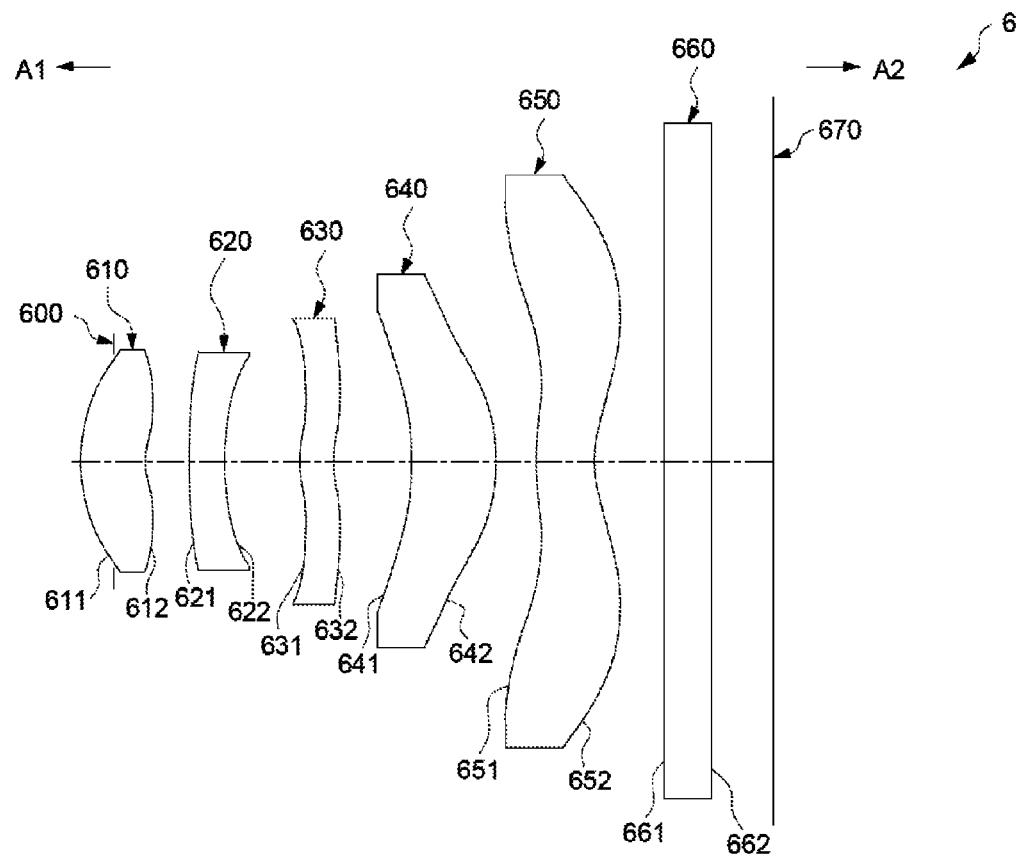
FIG. 22 is a cross-sectional view of a sixth embodiment of an optical imaging lens having five lens elements according to the present invention.
Figure 23:
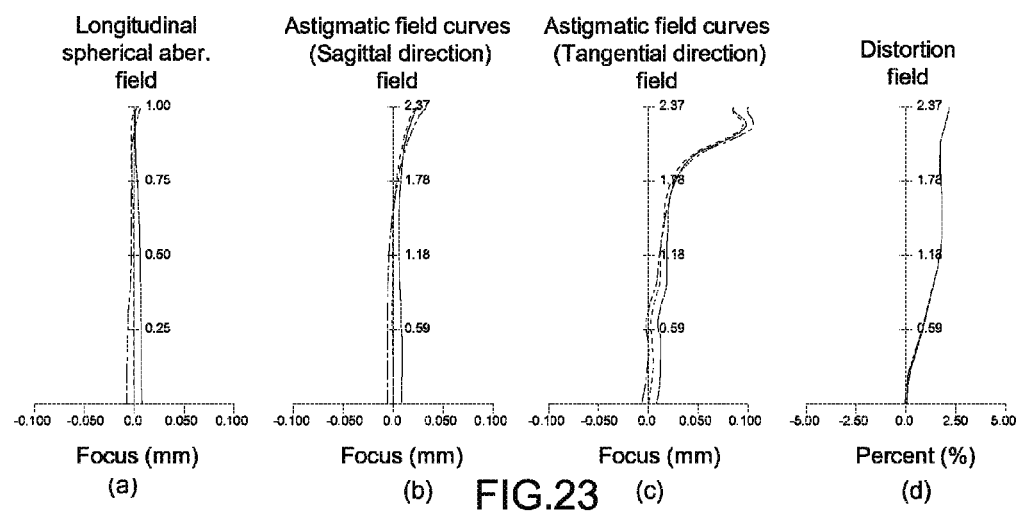
FIG. 23 is a chart of longitudinal spherical aberration and other kinds of optical aberrations of the sixth embodiment of the optical imaging lens according the present invention.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to an example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment.

As shown in FIG. 22, the sixth embodiment is similar to the first embodiment. The optical imaging lens 6, in an order from an object side A1 to an image side A2, comprises an aperture stop 600, first lens element to fifth lens element 610-650. A filtering unit 660 and an image plane 670 of an image sensor are positioned at the image side A2 of the optical imaging lens 6. The arrangement of the convex or concave surface structures, including the object-side surfaces 611-651 and image-side surfaces 612-652, and the refractive power of the lens elements 610-650 is same with the optical imaging lens 1. The difference between the optical imaging lens 1 and the optical imaging lens 6 is the values of the central thicknesses of the lens elements 610-650 and the air gaps between the lens elements 610-650 are slight different from the values of the optical imaging lens 1.

Please refer to FIG. 24 for the optical characteristics of each lens elements in the optical imaging lens 6 of the present embodiment, wherein the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12}+G_{45}}$$

are:

$$\frac{ALT}{T_1} = 3.95,$$

satisfying equations (1), and (1');

$$\frac{G_{aa}}{G_{12}} = 11.83,$$

satisfying equations (2), and (2');

$$\frac{G_{45}}{G_{12}} = 3.31,$$

satisfying equations (3), and (3');

$$\frac{f_3}{f} = 6.22,$$

satisfying equations (4);

$$\frac{G_{aa}}{T_1} = 1.95,$$

satisfying equations (5), (5'), and (5");

$$\frac{T_1}{G_{12}} = 6.05,$$

satisfying equations (6), and (6");
$G_{aa}$=0.90 mm, satisfying equations (7), and (7');

$$\frac{G_{aa}}{ALT \times G_{12}} = 6.50 \text{ mm}^{-1},$$

satisfying equations (8), (8'), and (8'''); and $$\frac{G_{aa}}{G_{12} + G_{45}} = 2.74,$$

satisfying equations (9), and (9').

The distance from the object-side surface 611 of the first lens element 610 to the image plane 670 is 3.65 mm, and the length of the optical imaging lens 6 is indeed shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Above all, the optical imaging lenses 1, 2, and 3 satisfying $$9.5 \leq \frac{T_1}{G_{12}}$$

have better effect of astigmatism in the tangential direction than the optical imaging lenses 4, 5, and 6 satisfying $$6 \leq \frac{T_1}{G_{12}} \leq 9.5$$

have. Specifically, although the optical imaging lens satisfying $$6 \leq \frac{T_1}{G_{12}} \leq 9.5$$

could reduce the length of the optical imaging lens and maintain good optical characteristics, the optical imaging lens satisfying $$9.5 \leq \frac{T_1}{G_{12}}$$

has better effect of correcting astigmatism (mainly in the tangential direction).

Additionally, the optical imaging lenses 1, 2, and 3 satisfying $$8 \text{ mm}^{-1} \leq \frac{G_{aa}}{ALT \times G_{12}}$$

have better effect of astigmatism in the tangential direction than the optical imaging lenses 4, 5, and 6 satisfying $$5 \text{ mm}^{-1} \leq \frac{G_{aa}}{ALT \times G_{12}} \leq 8 \text{ mm}^{-1}$$

have.

Please refer to FIG. 26, which shows the values of $$\frac{ALT}{T_1}, \frac{G_{aa}}{G_{12}}, \frac{G_{45}}{G_{12}}, \frac{f_3}{f}, \frac{G_{aa}}{T_1}, \frac{T_1}{G_{12}}, G_{aa}, \frac{G_{aa}}{ALT \times G_{12}}, \frac{G_{aa}}{G_{12} + G_{45}}$$

of all six embodiments, and it is clear that the optical imaging lens of the present invention satisfy the Equations (1)~(9).

Reference is now made to FIG. 27, which illustrates an example structural view of a first embodiment of mobile device 20 applying an aforesaid optical imaging lens. The mobile device 20 comprises a housing 21 and an image module 22 positioned in the housing 21. An example of the mobile device 20 may be, but is not limited to, a mobile phone.

As shown in FIG. 27, the image module 22 may comprise an aforesaid optical imaging lens having five lens elements of the optical imaging lens, for example the optical imaging lens 1 of the first embodiment, a lens barrel 23 for positioning the optical imaging lens 1, a module housing unit 24 for positioning the lens barrel 23, and an image sensor 171 which is positioned at an image side of the optical imaging lens 1. The image plane 170 is formed on the image sensor 171.

In some example embodiments, the structure of the filtering unit 160 may be omitted or replaced by coating on each lens element. In some example embodiments, the housing 21, the lens barrel 23, and/or the module housing unit 24 may be integrated into a single component or assembled by multiple components. In some example embodiments, the image sensor 171 used in the present embodiment is directly attached to the substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

In some example embodiments, the five lens elements 110, 120, 130, 140, 150 having refractive power are disposed inside the lens barrel 23 and spaced apart with air gaps therebetween.

In an embodiment, the module housing unit 24 comprises a lens backseat 2401 and an image sensor backseat 2406 disposed between the lens backseat 2401 and the image sensor 171. The lens barrel 23 and the lens backseat 2401 are disposed along an axis II', and the lens barrel 23 is disposed inside the lens backseat 2401.

Because the length of the optical imaging lens 1 is merely 3.68 mm, the size of the mobile device 20 may be quite small. Therefore, the present invention meets the market demand for smaller sized product designs, and maintains good optical characteristics and image quality. Accordingly, the present invention described herein not only reduces the amount of raw material for the lens housing and obtain economic benefits, but it also meets smaller sized product design trend and consumer demand.

Reference is now made to FIG. 28, which shows another structural view of a second embodiment of mobile device 20' applying the aforesaid optical imaging lens 1. One difference between the mobile device 20' and the mobile device 20 may be the module housing unit 24 further comprising a first lens seat 2402, a second lens seat 2403, a coil 2404, and a magnetic unit 2405. The first lens seat 2402, which is close to the outside of the lens barrel 23, and the lens barrel 23 are positioned along an axis II'. The second lens seat 2403 is positioned along the axis II' and around the outside of the first lens seat 2402. The coil 2404 is positioned between the outside of the first lens seat 2402 and the inside of the second lens seat 2403. The magnetic unit 2405 is positioned between the outside of the coil 2404 and the inside of the second lens seat 2403.

The lens barrel 23 and the optical imaging lens 1 disposed therein are driven by the first lens seat 2402 to move along the axis II'. The image sensor backseat 2406 is close to the second lens seat 2403. The filtering unit 160, for example an IR cut filter, is disposed on the image sensor backseat 2406. The rest structure of the mobile device 20' is similar to the mobile device 20.

Similarly, because the length of the optical imaging lens 1 is shortened (e.g., 3.68 mm), the mobile device 20' may be designed with a smaller size while maintaining good optical performance. Therefore, the present invention meets the market demand for smaller sized product designs, and maintains good optical characteristics and image quality. Accordingly, the present invention not only reduces the amount of raw material amount for lens housings and provide economic benefits, but it also meets smaller sized product design trend and consumer demand.

According to the above example embodiments, it is clear that the thickness of a mobile device and the length of an optical imaging lens thereof can be efficiently reduced through the control of the ratio between at least one central thickness of lens element and the sum of all air gaps along the optical axis between five lens elements in a predetermined range, and incorporated with detail structure and/or reflection power of the lens elements.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

The invention claimed is:

1. An optical imaging lens, sequentially from an object side to an image side, comprising first, second, third, fourth and fifth lens elements, each of said first, second, third, fourth and fifth lens elements having an object-side surface facing toward the object side and an image-side surface facing toward the image side, wherein:

said first lens element has positive refractive power, and said object-side surface thereof comprises a convex portion in a vicinity of the optical axis;

said second lens element has negative refractive power, said object-side surface thereof comprises a convex portion in vicinity of the optical axis, and said image-side surface thereof comprises a concave portion in a vicinity of the optical axis;

said image-side surface of said third lens element comprises a convex portion in a vicinity of a periphery of the third lens element;

said image-side surface of said fourth lens element comprises a convex portion in a vicinity of the optical axis;

said object-side surface of said fifth lens element comprises a convex portion in a vicinity of the optical axis, and said image-side surface of said fifth lens element comprises a concave portion in a vicinity of the optical axis and a convex portion in a vicinity of a periphery of the fifth lens element;

said optical imaging lens as a whole having only the five lens elements having refractive power, wherein the sum of the thickness of all five lens elements along the optical axis is defined as ALT, the central thickness of the first lens element along the optical axis is $T_1$, and ALT and $T_1$ satisfy the equation:

$$\frac{ALT}{T_1} \leq 4, \text{ and}$$

wherein said optical imaging lens satisfies the relation:

$$G_{aa} \leq 0.91 \text{ mm},$$

wherein $G_{aa}$ is a sum of all air gaps from the first lens element to the fifth lens element along the optical axis, and wherein said optical imaging lens further satisfies the relation:

$$\frac{G_{aa}}{G_{12} + G_{45}} \leq 5.5,$$

wherein $G_{12}$ is an air gap between the first lens element and the second lens element along the optical axis and $G_{45}$ is an air gap between the fourth lens element and the fifth lens element along the optical axis, and wherein $G_{aa}$, $G_{12}$ and $G_{45}$ satisfy the equations:

$$11.5 \leq \frac{G_{aa}}{G_{12}};$$

and $$\frac{G_{45}}{G_{12}} \leq 5.5."$$

2. The optical imaging lens according to claim 1, further comprising an aperture stop positioned at the object side of the first lens element.

3. The optical imaging lens according to claim 2, the focal length of the third lens element is f3, the effective focal length of the optical imaging lens is f, and f3 and f satisfy the equation:

$$0 < \frac{f_3}{f}.$$

4. The optical imaging lens according to claim 3, wherein Gaa and T1 satisfy the equation:

$$\frac{G_{aa}}{T_1} \leq 2.0.$$

5. The optical imaging lens according to claim 4, wherein $T_1$ and $G_{12}$ satisfy the equation:

$$6 \leq \frac{T_1}{G_{12}}.$$

6. The optical imaging lens according to claim 3, wherein $G_{aa}$, ALT and $G_{12}$ satisfy the equation:

$$5 \text{ mm}^{-1} \leq \frac{G_{aa}}{ALT \times G_{12}}.$$

7. The optical imaging lens according to claim 6, wherein $T_1$ and $G_{12}$ satisfy the equation:

$$9.5 \leq \frac{T_1}{G_{12}}.$$

8. The optical imaging lens according to claim 6, wherein $G_{aa}$, ALT and $G_{12}$ further satisfy the equation:

$$8 \text{ mm}^{-1} \leq \frac{G_{aa}}{ALT \times G_{12}}.$$

9. The optical imaging lens according to claim 1, wherein $G_{aa}$, ALT and $G_{12}$ further satisfy the equation:

$$6.5 \text{ mm}^{-1} \leq \frac{G_{aa}}{ALT \times G_{12}}.$$

10. The optical imaging lens according to claim 1, wherein $T_1$ and $G_{12}$ satisfy the equation:

$$6 \leq \frac{T_1}{G_{12}}.$$

11. A mobile device, comprising:
a housing; and
an image module positioned in the housing and comprising:
a lens barrel;
an optical imaging lens as claimed in claim 1 and positioned in the barrel;
a module housing unit for positioning the lens barrel; and
an image sensor positioned at the image side of the optical imaging lens.

12. The mobile device according to claim 11, wherein the module housing unit further comprises an a first lens seat and a second lens seat, the first lens seat is positioned close to the outside of the lens barrel and along with an axis, the second lens seat is positioned along the axis and around the outside of the first lens seat, and the lens barrel and the optical imaging lens positioned therein are driven by the first lens seat to move along the axis.

13. The mobile device according to claim 12, wherein the module housing unit further comprises an image sensor backseat positioned between the second lens seat and the image sensor, and close to the second lens seat.

* * * * *